(12) United States Patent
Grady et al.

(10) Patent No.: US 11,661,001 B2
(45) Date of Patent: May 30, 2023

(54) LIGHTING SYSTEM AND METHOD

(71) Applicant: SSR Lighting Technologies LLC, Crown Point, IN (US)

(72) Inventors: Daryl Grady, Crown Point, IN (US); Scott Grady, St. Johns, IN (US)

(*) Notice: Subject to any disclaimer, the term of this patent is extended or adjusted under 35 U.S.C. 154(b) by 0 days.

(21) Appl. No.: 17/395,383

(22) Filed: Aug. 5, 2021

(65) Prior Publication Data

US 2022/0041100 A1    Feb. 10, 2022

Related U.S. Application Data

(60) Provisional application No. 63/061,178, filed on Aug. 5, 2020.

(51) Int. Cl.

| | |
|---|---|
| *B60Q 3/30* | (2017.01) |
| *B60Q 3/53* | (2017.01) |
| *B60Q 3/62* | (2017.01) |
| *B60Q 3/88* | (2017.01) |
| *F21S 9/02* | (2006.01) |
| *F21V 23/06* | (2006.01) |
| *F21V 8/00* | (2006.01) |
| *F21V 23/00* | (2015.01) |
| *H02J 7/00* | (2006.01) |
| *F21V 23/04* | (2006.01) |
| *F21Y 115/10* | (2016.01) |

(52) U.S. Cl.
CPC ............... *B60Q 3/30* (2017.02); *B60Q 3/53* (2017.02); *B60Q 3/62* (2017.02); *B60Q 3/88* (2017.02); *F21S 9/02* (2013.01); *F21V 23/001* (2013.01); *F21V 23/0471* (2013.01); *F21V 23/06* (2013.01); *G02B 6/0046* (2013.01); *H02J 7/0042* (2013.01); *F21Y 2115/10* (2016.08)

(58) Field of Classification Search
CPC ... B60Q 3/30; B60Q 3/53; B60Q 3/62; B60Q 3/88; B60Q 3/40; B60R 16/03; F21S 9/02; F21V 23/001; F21V 23/0471; F21V 23/06; G02B 6/00046; H02J 7/0042; F21Y 2115/10; F21L 4/08
See application file for complete search history.

(56) References Cited

U.S. PATENT DOCUMENTS

| | | | | |
|---|---|---|---|---|
| 3,457,396 A | * | 7/1969 | Mrsny | B60Q 3/30 D26/85 |
| 4,438,483 A | * | 3/1984 | Gulliksen | F21V 14/045 362/186 |
| 5,602,526 A | * | 2/1997 | Read | B60Q 3/30 116/28 R |
| 6,902,415 B2 | * | 6/2005 | Ramsey | H02G 3/388 439/654 |
| 7,498,687 B2 | * | 3/2009 | Kinsey | H02J 1/14 307/38 |
| 9,834,133 B2 | * | 12/2017 | Bean | B60Q 1/305 |
| 10,458,627 B2 | * | 10/2019 | Perez-Bolivar | F21V 19/0065 |
| 10,967,784 B2 | * | 4/2021 | Hood | B60Q 3/74 |

(Continued)

*Primary Examiner* — Peggy A Neils

(57) ABSTRACT

A system (100) and method (900) for illuminating the interior space (90) of a trailer (84). The system (100) can utilize a power box (200) to draw and store electricity from a tractor (82) and use that electricity to activate LED assemblies (300) within the trailer (84) is untethered from the tractor (82). The lights (310) can be activated by a motion sensor (340) associated with the location of the lights (310) being activated.

20 Claims, 23 Drawing Sheets

(56) References Cited

U.S. PATENT DOCUMENTS

| | | | |
|---|---|---|---|
| 11,203,286 B1* | 12/2021 | Pampattiwar | H05B 47/14 |
| 2006/0197474 A1* | 9/2006 | Olsen | H05B 47/22 |
| | | | 315/312 |
| 2013/0107555 A1* | 5/2013 | Quinn | F21S 9/03 |
| | | | 362/485 |

* cited by examiner

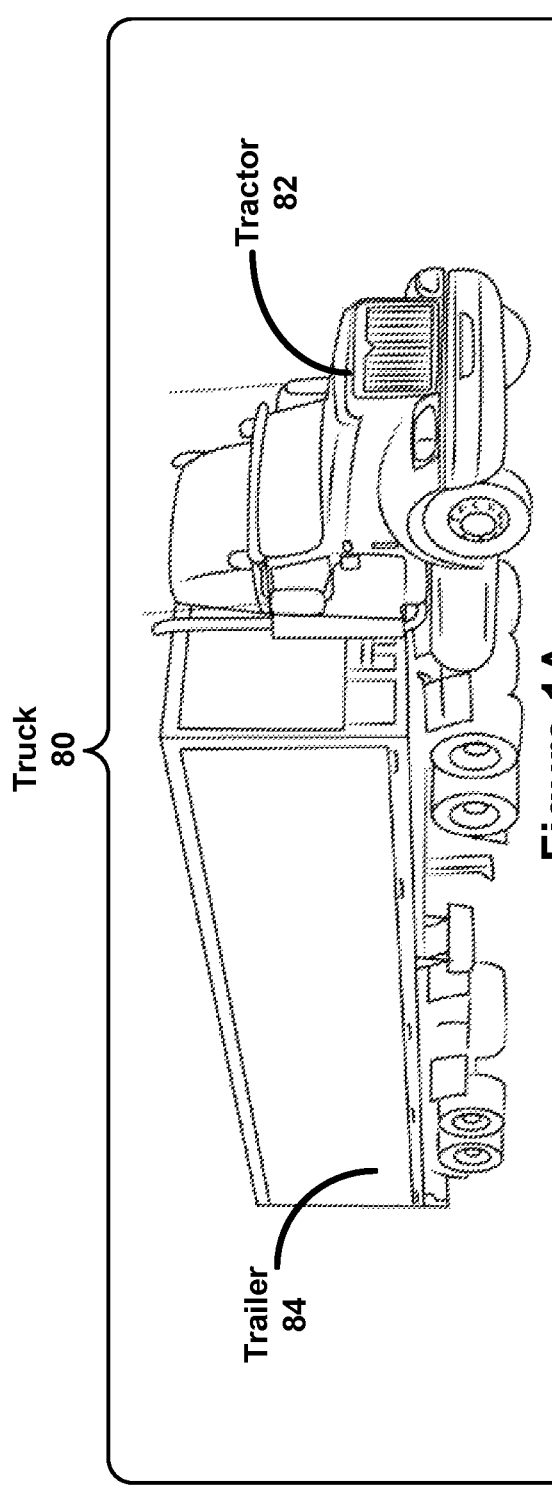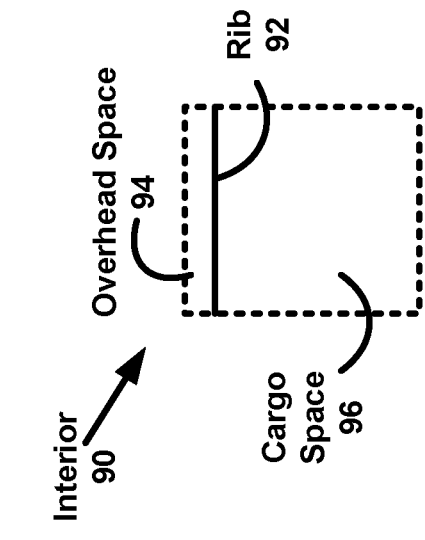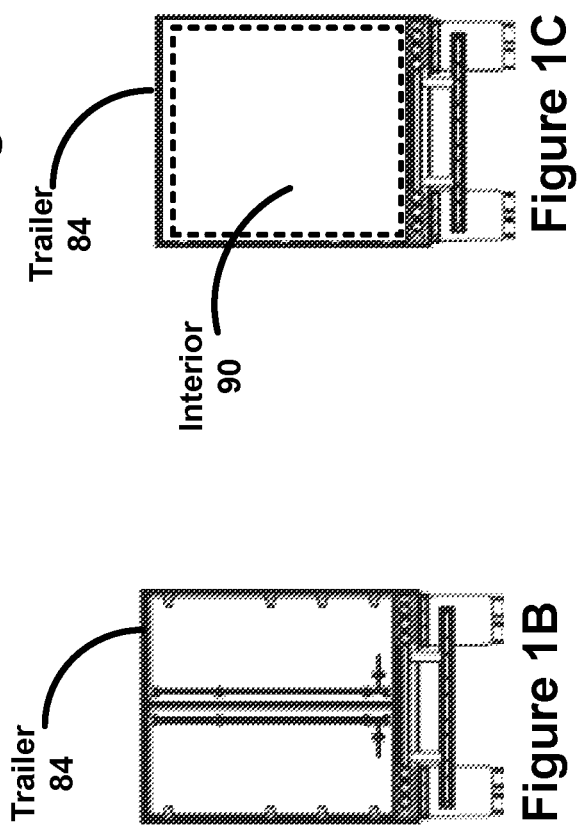

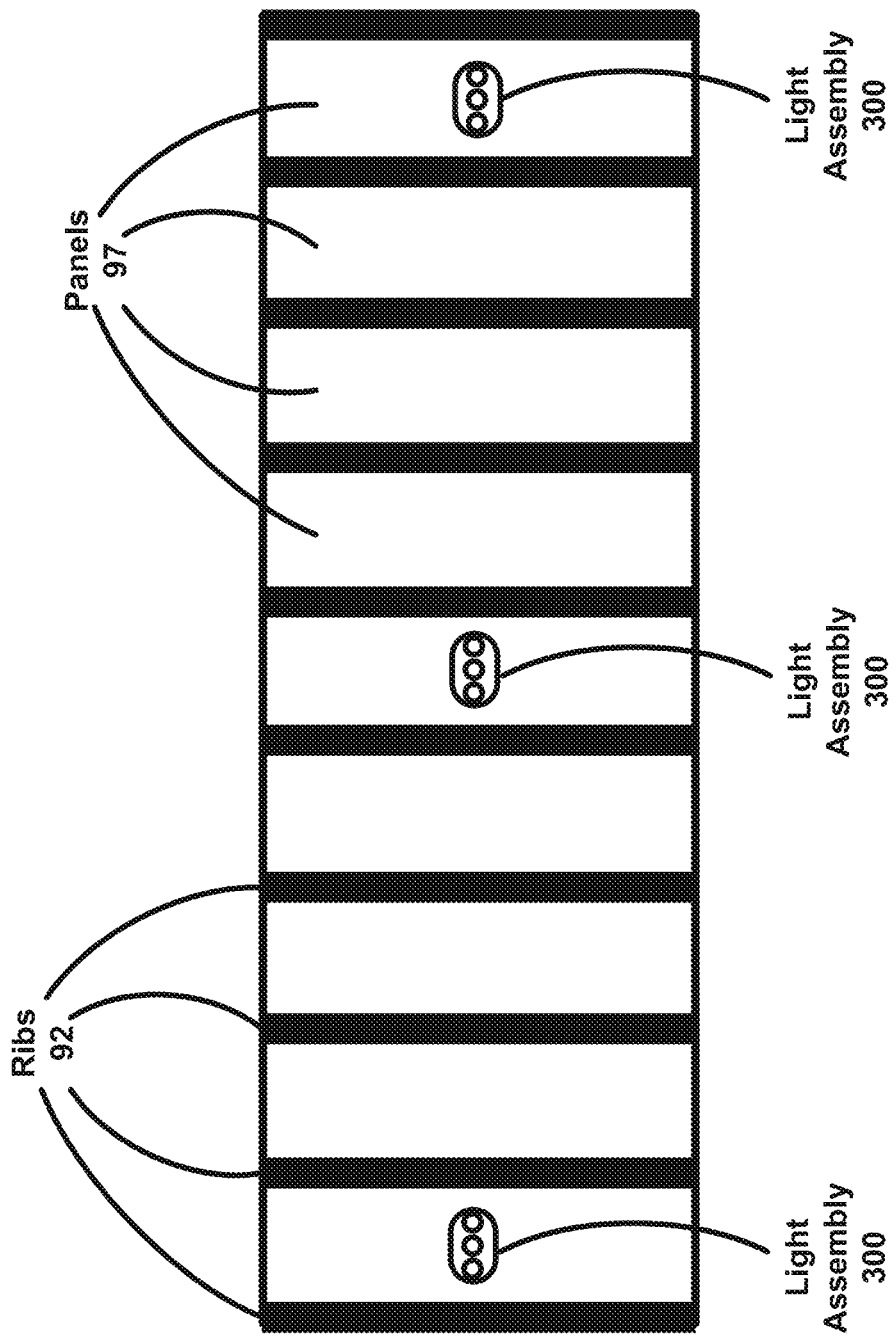

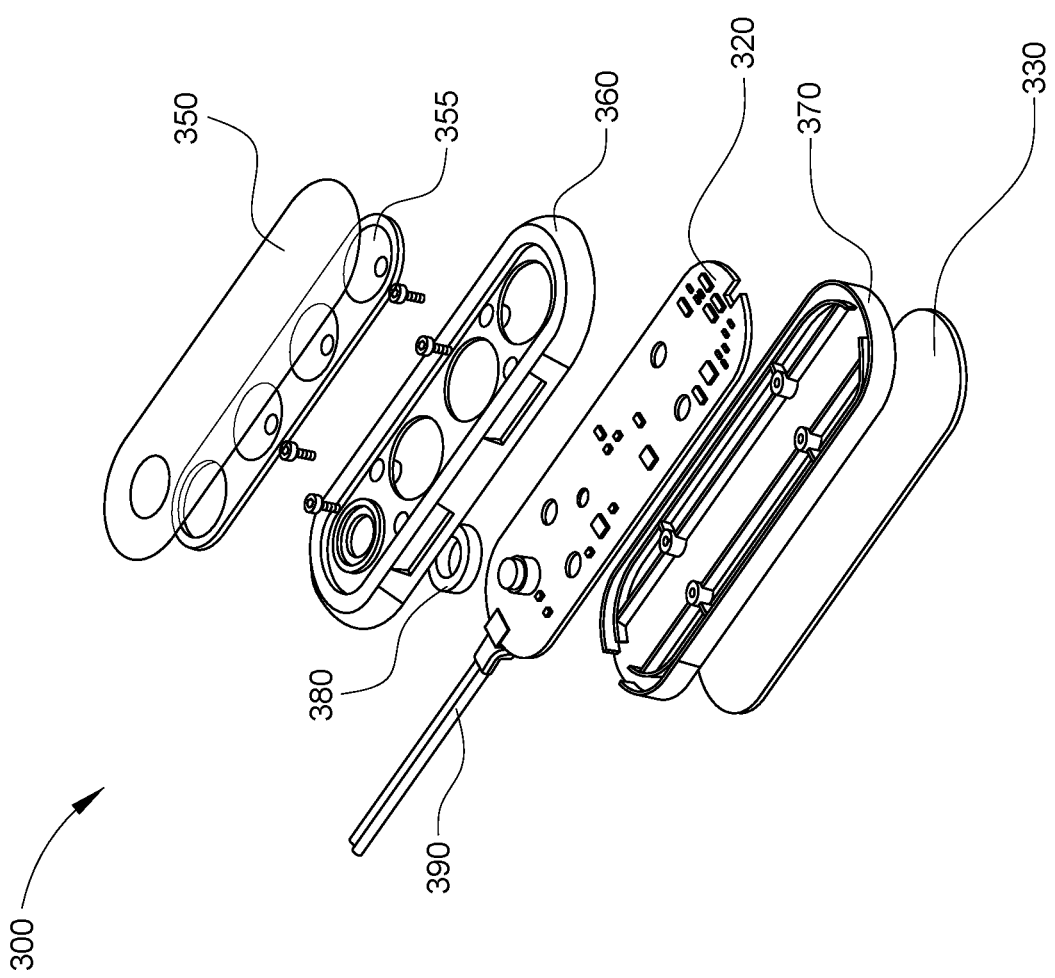

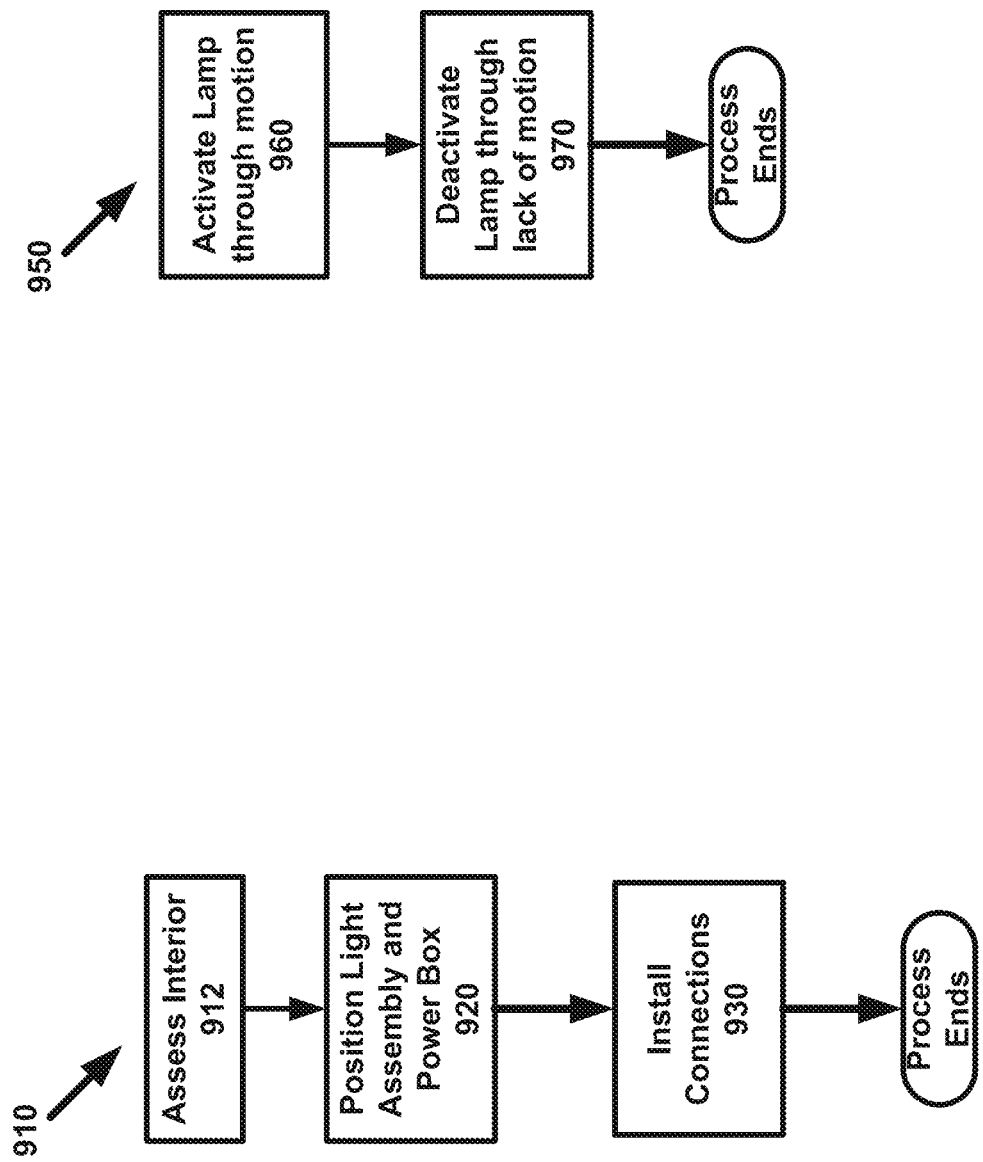

LIGHTING SYSTEM AND METHOD

RELATED APPLICATIONS

This utility patent application claims priority to the following provisional patent application, which is hereby incorporated by reference in its entirety: "LIGHTING SYSTEM AND METHOD" (Ser. No. 63/061,178) that was filed on Aug. 5, 2020.

BACKGROUND OF THE INVENTION

The invention is a lighting system and method (collectively the "system"). The system uses modular components that enable users to implement effective and robust lighting configurations designed to address the lighting requirements of the particular users and operating environments of the system. The system was originally conceptualized for use in the interior of a truck trailer, but the system can be implemented in other environments.

The trucking industry is critical to the economy of the United States. According to the markets.businessinser.com website, the domestic trucking industry in the U.S. generated just over $700 billion dollars in 2017. This is larger than the GDP of all but 32 countries in the world. According to the Bureau of Labor Statistics in 2018, 5.8% of all full-time workers in the US have jobs in the trucking industry. 10.8 billion tons of freight were moved via truck in 2017 according the American Trucking Associations. Trucks are reported to move 70% of all goods transported in the US. Some experts have predicted that most grocery stores would start running out of food within just 3 days after long-haul truckers stopped working. The average professional long-haul trucker logs more than 100,000 miles per year. Throughout the 2020 COVID-19 pandemic, truck drivers have been classified as essential personnel. Truck freight is expected to grow by 6% in 2021.

Given the importance of truck freight to the economy, the trailer of a truck is precious and yet non-optimized real estate. The interior of the trailer is repeatedly loaded and unloaded. The loading and unloading of a trailer interior often occur at nighttime or in otherwise inadequate light from dark conditions resulting from poor lighting with the trailer itself. Despite the importance of trucking and the need for a well-lit interior space during the loading and unloading of the interior of the trailer, prior art lighting technologies are inadequate and lacking in many important ways. Insufficient lighting can often lead to personal injuries, damage to cargo, delays in the unloading and loading of the trailer, and the otherwise needlessly non-optimal loading and unloading of the trailer, Prior art solutions to the problem of trailer lighting inevitably suffer from a lack of durability, a lack of configurability, and the constraints of being tethered. Many trailer lighting systems involve extrusions that are subject to being hit by forklifts during the loading or unloading of the trailer, resulting in such lights being damaged and/or dislodged.

Prior art lighting systems utilized within the interiors of trailers typically use flat structures, which result in non-dimensional LED emission. This creates a work environment that is literally uncomfortable for human beings. Conventional power control boards often have problems caused by high temperatures and the absence of a heat sink and are prone to electrical shorts caused by condensation, which can be a common occurrence resulting from different temperatures within the interior and exterior of the trailer. Such systems utilize fragile two-connectors without universal port connections. Soldering, scotch lock failures, difficult component replacements, and other undesirable attributes plague such prior art approaches.

It would be desirable for a more resilient, efficient, modular, customizable, and easy to install lighting system to be incorporated into the trailer interiors used in the trucking industry today.

The system is described in greater detail below in the Summary of the Invention section.

SUMMARY OF THE INVENTION

The invention is a lighting system and method (collectively the "system"). The system uses modular components that enable users to implement effective, robust, and highly configurable lighting configurations that address the lighting requirements of the particular users and operating environments of the system. The system was originally conceptualized for use in the interior of a truck trailer, but the system can be implemented in other environments.

The system can use a power box to power multiple LED assemblies used to generate light. The system can be implemented as recess lights in between the ribs near the ceiling in the interior area.

The system can be manufactured and sold as a "kit" that mechanics, technicians, truck drivers themselves, or other personnel can install within the interior of the trailer. The system can be utilized to light the interior of the trailer whether or not the trailer is attached to the tractor at that time. The untethered trailer can draw power from a batter within the power box to provide the desired lighting. The luminosity of the system can be implemented in a substantially modular manner, with lighting components and/or batteries being added or subtracted. In many embodiments, it may be optimal to use 8 lights to best luminate the interior of a semi-trailer, with the expectation of generating 5 hours of continuous light before the recharging of the battery is required. The battery can be recharged through the use of solar panels, the power system of the trailer, or an external power source.

The system can be better understood by referencing the drawings discussed below.

BRIEF DESCRIPTION OF THE DRAWINGS

Different examples of various attributes, components, and configurations that can be incorporated into the system are illustrated in the drawings described briefly below. No patent application can expressly disclose in words or in drawings, all of the potential embodiments of an invention. In accordance with the provisions of the patent statutes, the principles, functions, and modes of operation of the system are illustrated in certain preferred embodiments. However, it must be understood that the system may be practiced otherwise than is specifically illustrated without departing from its spirit or scope.

FIG. 1A is a perspective diagram illustrating an example of a truck that can utilize the system.

FIG. 1B is a rear-view diagram illustrating an example of a truck that can utilize the system.

FIG. 1C is a rear diagram illustrating an example of an interior space that is behind the rear doors of the trailer in FIG. 1B.

FIG. 1D is a rear-view diagram of the interior space illustrating an example of ribs dividing the space into cargo space and overhead space.

FIG. 2E is an example of a view of the ceiling from within the interior space in which the system has been installed.

FIG. 4B is an exploded perspective view diagram illustrating an example of a light assembly.

FIG. 6A is a flow chart diagram illustrating an example of a method for installing the system.

FIG. 6B is a flow chart diagram illustrating an example of a method of using the system components as installed.

Figure 1E:
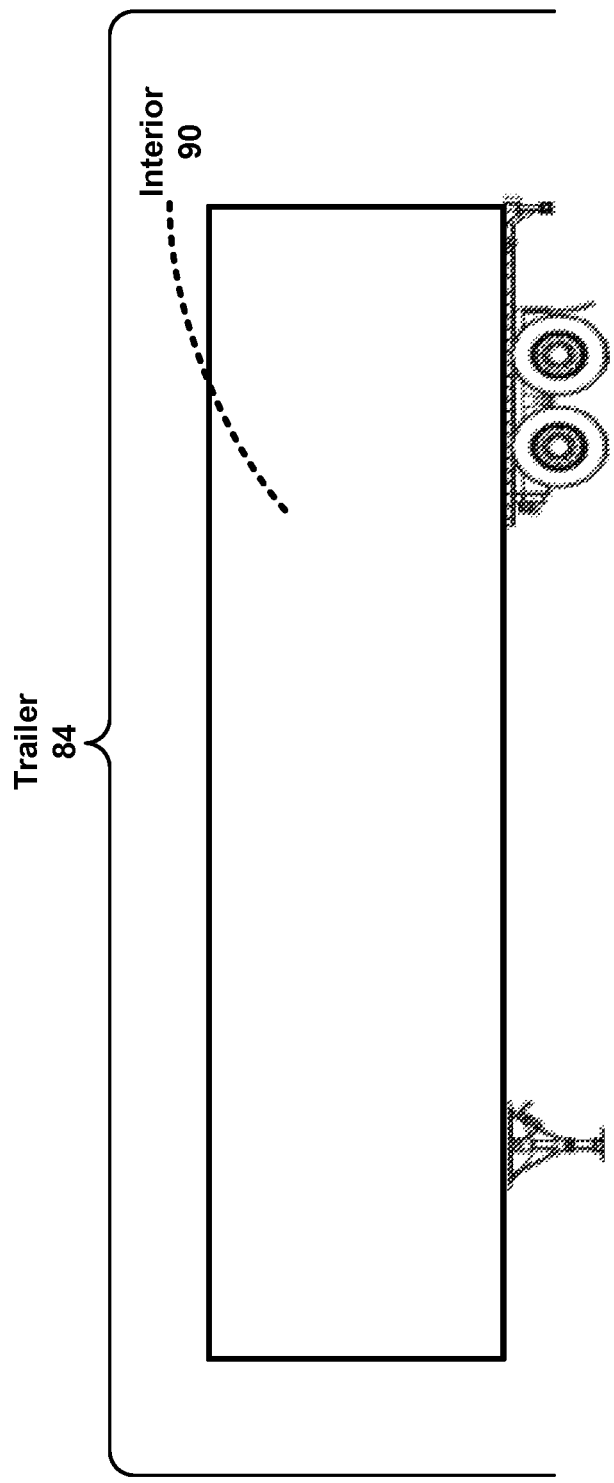
FIG. 1E is a side view diagram illustrating an example of a trailer that can utilize the system that is detached from the tractor, an illustration that includes the interior space.

The system can be further understood by the text description provided below in the Detailed Description section.

DETAILED DESCRIPTION

The invention relates generally to the systems and methods for illuminating a space. More specifically, the invention is system and method for lighting the interior of a trailer (collectively the "system"). All element names and element numbers are listed and defined in Table 1 below.

I. Alternative Embodiments

Different examples of various attributes, components, and configurations that can be incorporated into system 100 are illustrated in the drawings and described in Table 1. However, no patent application can expressly disclose in words or in drawings, all of the potential embodiments of an invention in a comprehensive manner. In accordance with the provisions of the patent statutes, the principles, functions, and modes of operation of the system 100 are illustrated in certain preferred embodiments. However, it must be understood that the system 100 may be practiced otherwise than is specifically illustrated without departing from its spirit or scope. Alternative embodiments of the system 100 can be described and categorized on the basis of a variety of variables, such as number of LED assemblies, different types of ways to recharge the battery 210, different positional and geometry configurations within the interior space 90, etc.

II. Advantages to Users

The system can be implemented in such a manner as to vastly improve the safety and productivity of loading and unloading trucks.

The battery in the power box allows the system to illuminate the interior of a truck even when the trailer is not tethered to the tractor and its power source.

The system is highly configurable, so the different numbers of light assemblies can be installed in different configurations to meet the needs of the particular operating environment as well as the operators of the truck.

The components of the system are easy to install. When coupled with the highly modular nature of the components, it would be easy to sell the system as "kits"!

Current lighting solutions are difficult to fasten to specific locations, and they are easily damaged by high temperatures, the impact of condensation on electronic components, and the physical impact of loading and unloading cargo from the cargo area. The system can be implemented almost exclusively in the unused or at least underused overhead space above the ribs and above the cargo space of the interior. Only the very thin light assemblies take up any cargo space, and as recess lights, they take only a sliver.

The power box which in a preferred embodiment is affixed to a surface in the overhead space provides an electrical infrastructure that is useful for lighting, is capable of being charged through variety of different means, including the battery in the tractor, a connected solar power assembly, or even by plugging in to a conventional power outlet. That electrical infrastructure can find additional uses in the future that have little to do with lighting.

By using "smart" processors, energy consumption can be minimized, risk to equipment avoided, and the storing of electricity for a later time can be maximized. The system can deliver 5-8 hours of lighting between charges, which is more than enough for a typical loading and unloading of the cargo area.

By including a motion detector in each lighting assembly, illumination is provided as needed. There is no reason to light up an entire 53-foot-long trailer if only a small portion is being used. Each lighting assembly is "smart" with its own infrared sensor, LED lights, and motion detector.

III. Glossary of Terms

All terminology associated with an element number is defined in Table 1 below.

TABLE 1

| Element Number | Element Name | Definition/Description |
|---|---|---|
| 80 | Truck | A vehicle that includes a trailer 84 for carrying cargo and a tractor 82 for enabling the movement of the trailer 84 and the cargo within the trailer 84. The system 100 can be implemented in a wide variety of different operating environments, but the system 100 was originally conceptualized in the context of semi-trucks. In most truck 80 embodiments, the tractor 82 can be separated from the trailer 84. The system 100 can be implemented in environments not limited to trucks 80. |
| 82 | Tractor | The portion of the truck 80 that is capable of being driven as a vehicle and enabling the movement of the trailer 84. |
| 84 | Trailer | The portion of the truck 80 that includes an interior 90 into which cargo can be loaded and from which cargo can be unloaded. |
| 90 | Interior | The area inside the trailer 84. The inside of a trailer 84 typically includes ribs 82 which vertically divide the interior space 90 into cargo space 96 and overhead space 94. |
| 92 | Rib | A member that horizontally traverses the interior 90 of the trailer 84 in a vertical position that is close to the ceiling or top of the interior 90. The system 100 is typically installed as recess lights between ribs 92, utilizing the ribs 92 to both help secure the position of the components of the system 100 as well as to partially shield the components of the system 100 from being impacted by the movement of forklifts, cargo, and operator personnel. |
| 94 | Overhead Space | Space above and between the ribs 92 in which components of the system 100 are positioned. The various connectors 400 of the system 100 can be located in the overhead space 94, which prevents components from being accidentally dislodged when cargo is loaded into or unloaded out of the interior 90. |
| 96 | Cargo Space | Space below the ribs 92 where cargo is loaded, stored for transport, and subsequently loaded. |

TABLE 1-continued

| Element Number | Element Name | Definition/Description |
|---|---|---|
| 97 | Gap | The empty space between ribs 92. |
| 98 | Panel | A tile or other thin material used to fill in a gap 97 between ribs 92. Panels 98 and ribs 92 collectively separate the overhead space 94 from the cargo space 96 and create a substantially uniform ceiling in the cargo space 94. |
| 100 | System | A configuration of assemblies and components that perform the function of illuminating the interior 90 of the trailer 84 so that it can be loaded, unloaded, inspected, and otherwise utilized in an efficient and safe manner. The system 100 can include one or more power boxes 200 and one or more light assemblies 300 that are connected by one or more connectors 400. |
| 200 | Power Box | A power box 200 is an assembly of components that are collectively configured to deliver electricity to one or more light assemblies 300 so that the system 100 can illuminate the interior 90 of the trailer 84. The power box 200 can include components such as a battery 210 and charging module 220. The power box 200 can enable the system 100 to function (i.e., illuminate the interior 90) even when the trailer 84 is not attached to the tractor 82 and as such is unable to draw power from the tractor 82. The power box 200 enables the system 100 to function when the tractor 82 is untethered from the trailer 84. The power box 200 can draw power from the tractor 82 when the tractor 82 is tethered to the trailer 84. |
| 210 | Battery | A device for storing electricity that is capable of being recharged. A battery 210 consists of one or more cells in which chemical energy is converted into electricity and used a as a source of power. In many embodiments, the battery 210 is a 12 VDC AGM battery capable of providing between 5-8 hours of light between charging. |
| 220 | Charging Module | An assembly that is used for charging the battery 210. The charging module can utilize solar power, power from the tractor 82, or an external power source such as an AC outlet to recharge the batter 210. |
| 221 | Circuit Board | This can also be referred to as the power box circuit board 221 since each light assembly 300 can include its own circuit board.320. The circuit board 221 can implement a charging algorithm to ensure maximum battery life, as well as provide for over charge protection, a low voltage cut-out function, and vehicle jump start protection. The circuit board 221 can include a processor to manage the functions of the charging module 220. |
| 222 | Cover | This component can also be referred to as the charging module cover 222 as other components of the system 100 can include coverage components. The cover 222 encloses the interior components of the charging module 220, such as the circuit board. The cover 222 typically constitutes the top of the charging module 220 and the top of the power box 200. |
| 223 | Case | A structural component that in conjunction with the cover 222, enclose the circuit board 221. This component can also be referred to as the charging module case 223. |
| 224 | Fastener | The charging module can use a variety of different fasteners 224 such as bolts, screws, nuts, washers, and other similar mechanisms. |
| 225 | Cable | In a preferred embodiment the cable 225 is a Pigtail ASM cable. |
| 226 | Grommet | An optional cover over the cable 225. |
| 227 | Gasket | An optional component to keep moisture away from the circuit board 221. |
| 228 | Mating Plug | This plug or connector is where the 6-way end of the trailer harness 410 is plugged into the charging module 220 of the power box 200. This component can also be referred to as a mating connector 228. |
| 230 | Foam Liner | A substrate of material adjacent to the battery 210 that protects the battery 210 and increases the durability of the battery 210. |
| 240 | Mounting | A structure used to securely position the power box |

TABLE 1-continued

| Element Number | Element Name | Definition/Description |
|---|---|---|
| | Plate | 200 within the interior space 90 of the trailer 84, typically in the overhead space 94. |
| 250 | Case | A component of the power box 200 that consists of a surface that constraints the position of other components of the power box 200. This component can also be referred to as the power box case. |
| 255 | Cap Cover | A structural component of the power box 200 that is vertically at the opposite end of the power box 200 from the charging module assembly 220 and the mating plug 228. |
| 260 | Cover | A component of the power box 200 that closes off the case 250 from the exterior environment of the interior space 90. This component can also be referred to as the power box cover. |
| 270 | Wire Guide | A structural component used to secure the position of the cable 225 components of the power box 200 relative to each other. |
| 280 | Fasteners | Screws, bolts, washers, and other similar connectors used to secure different components of the power box 200 together. |
| 290 | Frame | A structural component that interfaces between the mounting plate 240 and the rest of the power box 200. |
| 300 | Light Assembly | A configuration of components that collectively receive power from the power box 200 in order to generate light within the interior space 90. The light assembly 300 can also be referred to as Lamp Assembly 300 or an LED Assembly 300, as the lamps 310 are typically LEDs 310. The LED assembly 300 can include components such as LEDs 310, circuit boards (CBs) 320, self-adhesive stickers 330, motion sensors 340, lenses 350, covers 360, bases 370, seals 380, cables 390, and fasteners 398. |
| 310 | LED or Lamp | A light source. In most embodiments, a light emitting diode 310. |
| 320 | CB or Control Board | A circuit board used to control the turning on and turning off of LEDs 310. This component can also be referred to as the light assembly circuit board 320. The circuit board 320 can include a processor to manage the functions of the charging module 220. |
| 330 | Self-adhesive sticker | A sticker used to secure the position of the LED assembly 300 in the interior space 90. |
| 340 | Motion Sensor | A device connected to the circuit board 320 such that movement of objects or people automatically triggers the activation of the desired LED or LEDs 310 based on the location of the detected movement. |
| 350 | Lens | A substrate used to direct light in an efficient pattern |
| 355 | Light Guide | A structure for directing light, typically cone shape and mirrored to make the resulting light less harsh to human eyes. |
| 360 | Cover | A structure or surface for constraining the components of the light assembly 300. |
| 370 | Base | A structure that supports the sticker 320 and the light assembly 300. |
| 380 | Seal | A component that closes off the interior of the light assembly 300 from the exterior environment. |
| 390 | Cable | Power line extending outward from LED assembly 300 that can be plugged into a connector 400 of the system 100, typically a splitter harness 440. |
| 398 | Fasteners | Screws, bolts, nuts. washers, and other similar connectors used to secure different components of the light assembly 300 together. |
| 400 | Connector | A wire of cable that is capable of delivering electrical current. |
| 410 | Trailer Harness | A connector 400 used by the system 100 to connect the power box 200 to the various light assemblies 300, the power source on the tractor 82, to ground, and optionally, to a solar power kit 500. |
| 412 | 6-Way Connector | A mating mechanism on one end of the trailer harness 410. |
| 440 | Splitter Harness | A connector 400 used in conjunction with jumper harnesses 400 to implement a flexible, modular, and configurable chain of light assemblies 300 powered through the power box 200. The split harness has four prongs, each of which are "dummy proof" to prevent damage from user error. |
| 442 | Molex Connector | A mating mechanism on the splitter harness 440. |
| 470 | Jumper Harness | A 1 to 1 connector used to string a long a series or sequence of splitter harnesses 400. |
| 472 | Molex Connector | A mating mechanism on the jumper harness 470. |
| 500 | Solar Charging Kit | An optional assembly or kit that includes solar panels which can be connected to the power box 200, enabling the use of solar power to charge the battery 220. |
| 900 | Method | A process relating to the system 100. |
| 910 | Installation Method | A process for installing the system 100 within a particular interior space 90. The process can include steps such as analyzing the space at 912, determining a number of LED assemblies 300 at 914, and positioning the desired components of the system 100 relative to the ribs 92 in the interior space. |
| 950 | Method of Use | A process of using the system 100 within a particular interior space 90. The process can include steps such as charging the battery at 952, automatically (without human intervention) detecting movement using the motion sensors at 954, automatically (without human intervention) activating the corresponding LEDs at 956, and automatically turning off the activated LEDs after a period of time at 958. |

IV. Overview

The system 100 is a more resilient, modular, and efficient way to light the interior space of a trailer. It can function when the trailer is standing alone, separate, detached, and untethered from the tractor. However, while the trailer is attached to the trailer, the battery used to power to lights of the system can draw power from the tractor. The system uses sensors to only activate lights that are in areas where they are needed. The system can be sold as a kit that is implemented into existing trailers, and it is easy to configure and install. Luminosity can be customized by adding or subtracting lights, as the system can be extremely modular in its design and capabilities. The battery can be recharged through the use of solar panels, the tractor battery, or an external AC outlet.

The cone-shaped geometry of the light guide in the LED assembly makes the LED emission highly directional. This is something that is applicable for Semi trailer use from the height it is located, the brightness being omitted, and the number of lights being mounted to cover a 53-foot-long interior with overlapping lamps.

The circuit board in the light assembly can be laid out for maximum efficiency for heat, and allows prewiring, and motion sensing, and voltage regulation. There is a heat sink to hold the circuit board away from the ceiling. The size of the lamp itself to hide under a ceiling strut. It is also made of durable and light way materials to withstand the environment of the trailer, include large semi-trailers.

The power box holds the battery and a circuit board that controls the charging and utilization of the batter. The power box cane be mounted using fasteners to a surface in the trailer, preferably surfaces in the overhead space. The circuit board in the power box can recharge itself using connections for solar and reverse polarity protection. The foam mounting on the battery for durability. The power box circuit board is protected and utilizes easy to connect and disconnect cables.

The light assemblies use a highly reliable trunk cable to draw power from the battery box using durable and small connectors that are one way. Any port may work in a "plug and play" fashion. The operator can connect as many or as few as desired. No soldering, no scotch lock failures, and individual LEDs in need of replacing can be easily replaced on an individual basis given the modular design. The lights are placed in between the ribs, recessed, that is why they can only be so deep in their assembly. They must be below the ribs. During installation it would be wise to set them close to the rib for further protection.

The power box houses a battery that can be replaced, if need be, and it houses the circuit board for the controlling of current to lights and redirection of charge to battery for recharging. It also protects from voltage spikes and current reversal.

Because of the battery system the lights can be used for up to 5 hours continuously while the trailer is dropped, and then recharge can happen with three methods.

Each light assembly can have its own motion sensor, its own circuit board, and multiple LED lights. The circuit board can also regulate voltage and wiring that that is a long a 53 trailer present an issue with voltage drop.

The light is thin and has self-sticking adhesive. Each light has its own motion sensor it will save charge/life, and only light in area of continuous work. Each light body is made to lift the circuit board away from the hot trailer roof for longer life of the components. Each light can have a lens that directs the most efficient pattern to the trailer. Each light is pre-wired in advance prior to installation. The truck cable is already bound in loomed. The truck cable has a unique mounting attachment for the lights that can be done quickly without scotch locks or error of wiring, saving significant and avoiding the risk of lights not working. The system is truly an entire integrated system for lighting a trailer while being attached and unattached from the tractor with lights specifically designed for the needs inside of a trailer, along with a thought-out process for installation, and life longevity.

V. Operating Environment

FIG. 1A is a perspective diagram illustrating an example of a truck 80 that can utilize the system 100.

FIG. 1B is a rear-view diagram illustrating an example of a truck 80 that can utilize the system 100.

FIG. 1C is a rear diagram illustrating an example of an interior space 90 in front of the rear doors of the trailer in FIG. 1B.

FIG. 1D is a rear-view diagram of the interior space 90 illustrating an example of ribs 92 dividing the space into cargo space 96 and overhead space 94.

FIG. 1E is a side view diagram illustrating an example of a trailer 84 that can utilize the system 100 that is detached from the tractor 82, an illustration that includes the interior space 90.

Figure 1F:
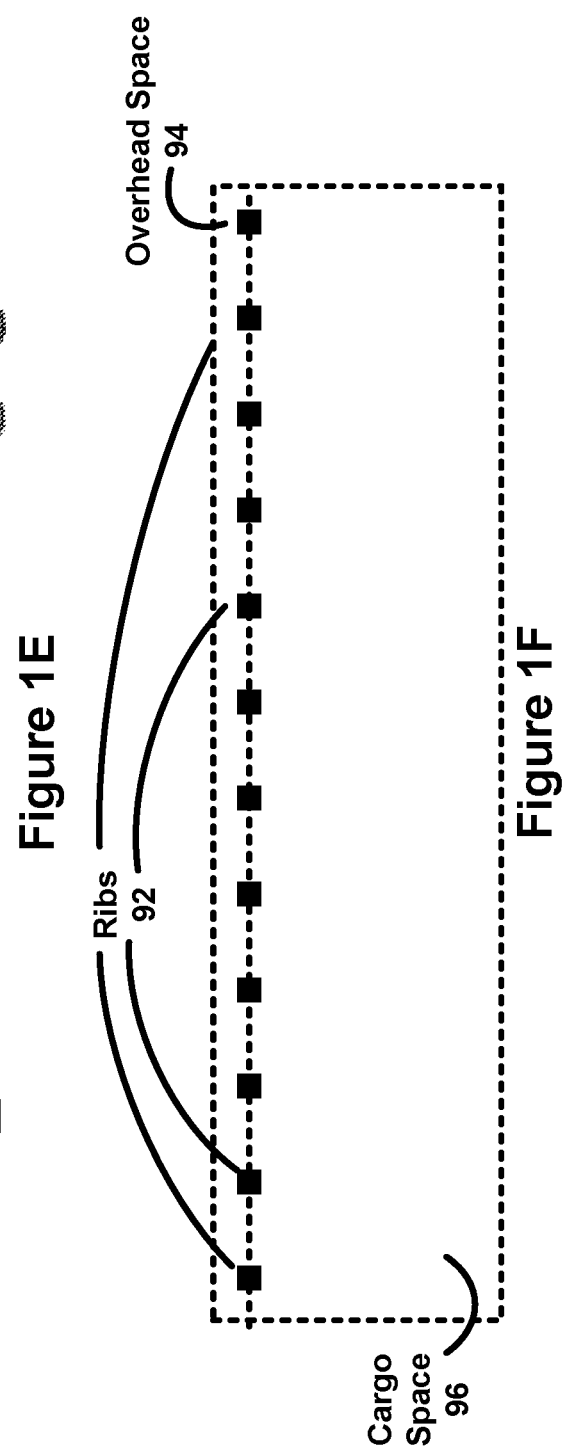
FIG. 1F is a side view diagram illustrating an example of the trailer, including ribs that mark the border of the cargo space and the overhead space.

FIG. 1F is a side view diagram illustrating an example of the trailer 90, including ribs 92 that mark the border of the cargo space 96 and the overhead space 94.

Figure 1G:
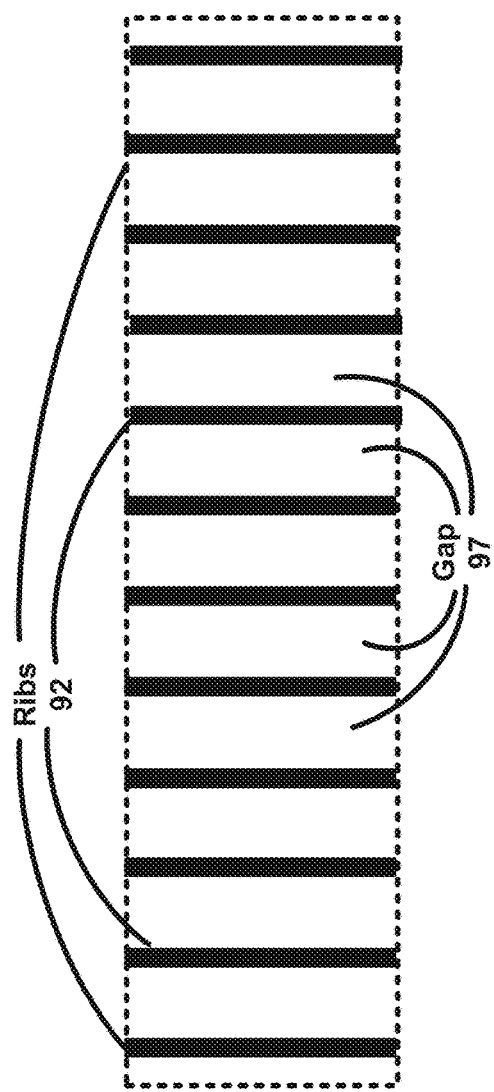
FIG. 1G is a top view diagram of the interior space that corresponds with the side view of FIG. 1F.
Figure 1H:
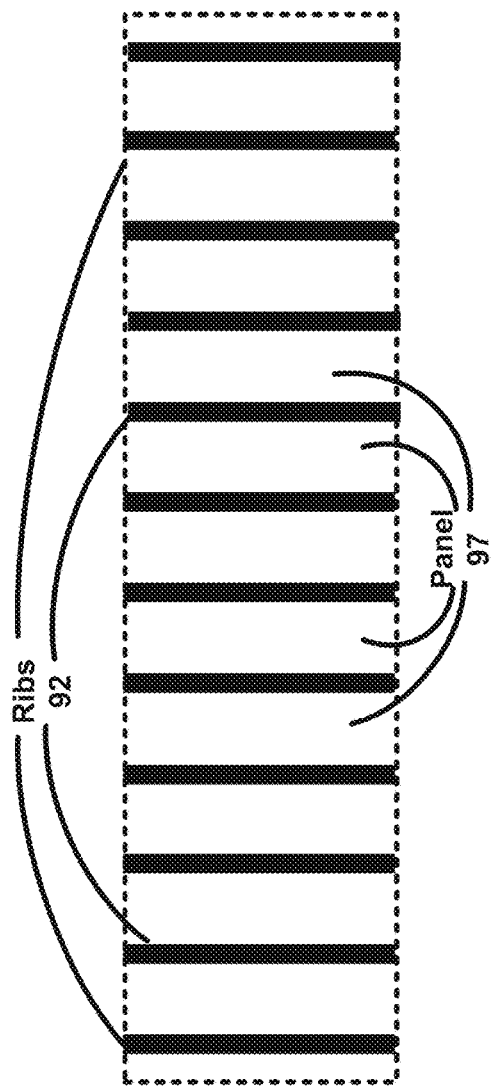
FIG. 1H is a diagram similar to that of 1G except where panels fill the gaps between the ribs.

FIGS. 1G and 1H illustrate the gaps 97 between ribs 92, and that gaps 97 and be filled with panels 98.

Interior lighting within a trailer 84 is made very difficult by a variety of factors. The temperatures can get extremely hot. The purpose of the cargo area 96 is to load, move, and unload cargo. Any lighting configuration implemented in that environment is likely to be damaged by high temperatures and collisions that occur during the loading/unloading process. Furthermore, a trailer 84 has no electrical power when it is not tethered to the tractor 82. The system 100 was conceptualized to address these problems.

VI. System as a Whole

Figure 2B:
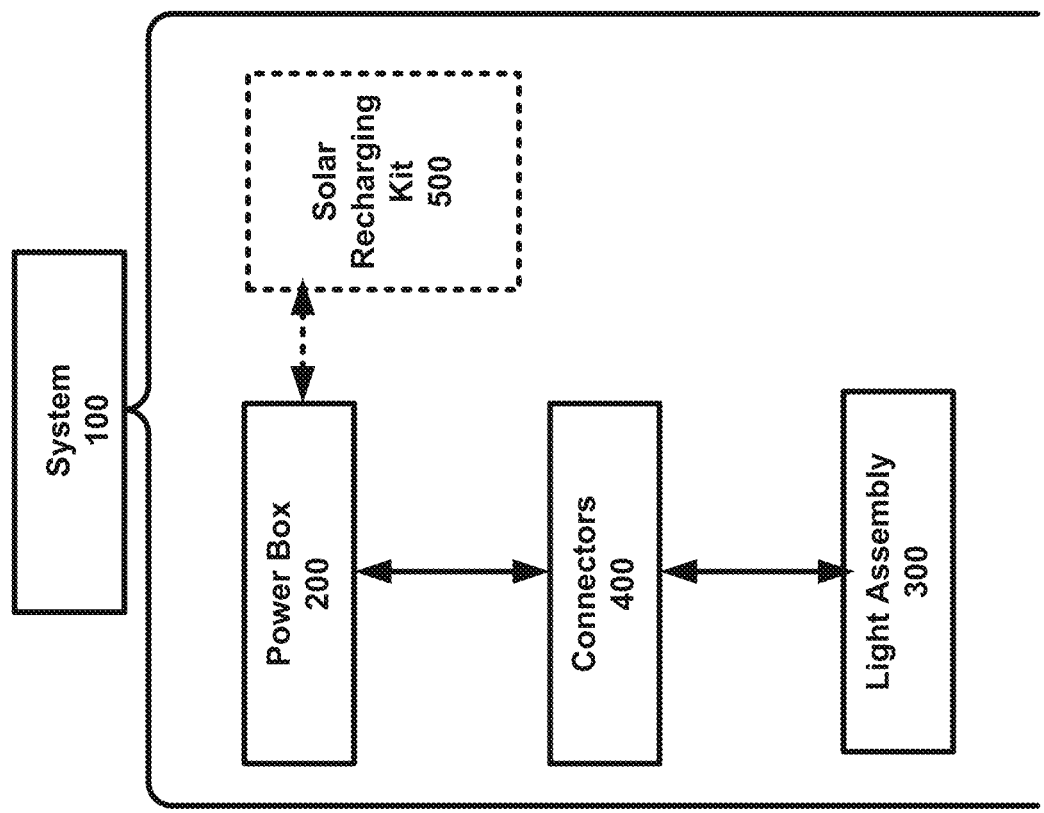
FIG. 2B is a block diagram illustrating an example a system that includes an option solar charging kit that provides an additional way to charge the batter in the power box.
Figure 2A:
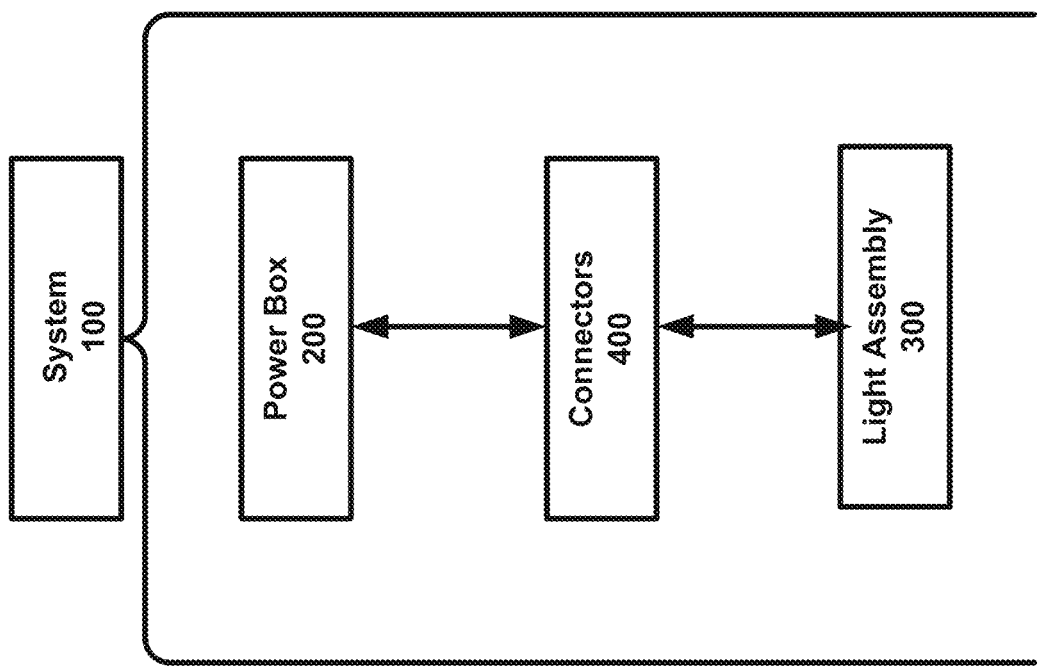
FIG. 2A is a block diagram illustrating an example of the three categories of assemblies and components that comprise the system.

To provide better illumination of the trailer 84 during the loading and unloading of the cargo area 96 of the interior 90, the system 100 utilizes the components illustrated in FIG. 2A.

The power box 200 intelligently controls and manages the electrical needs of the system 100. A power box 200 is used to provide electrical power to the system 100 when the trailer 84 is untethered from the tractor 82. A circuit board 221 within the power box 200 can: (1) apply a charge algorithm to manage battery life; (2) involve protection against overcharges; (3) perform cut out function if voltage gets too low; (4) provide reverse battery protection; and (5) vehicle jump start protection.

The light assemblies 300 provide the function of illumination. The light assemblies 300 can use their own circuit board to control the activation of LED lights 310 using a motion sensor 340 sharing the same circuit board. Lights 310 are only used as needed, to minimize the draining of the battery 210 in the power box 200. The light from the LEDs 310 is filtered through a cone-shaped light guide 355 so that the light does not appear overly harsh to human beings.

These two components are electronically linked through a variety of different connectors 400. In a preferred embodiment of the system 100, a trailer harness 410 is used to put the power box 200 in the same circuit as the other components of the system 100. Alternating splitter harnesses 440 and jumper harnesses 470 have error proof mating components to prevent user error and resulting damage to the components of the system 100.

As indicated in FIG. 2B, the system can integrate with other power sources such as a solar power kit 500. Conventional electrical outlets can also be used to charge the battery 210 in the power box 200.

Figure 2C:
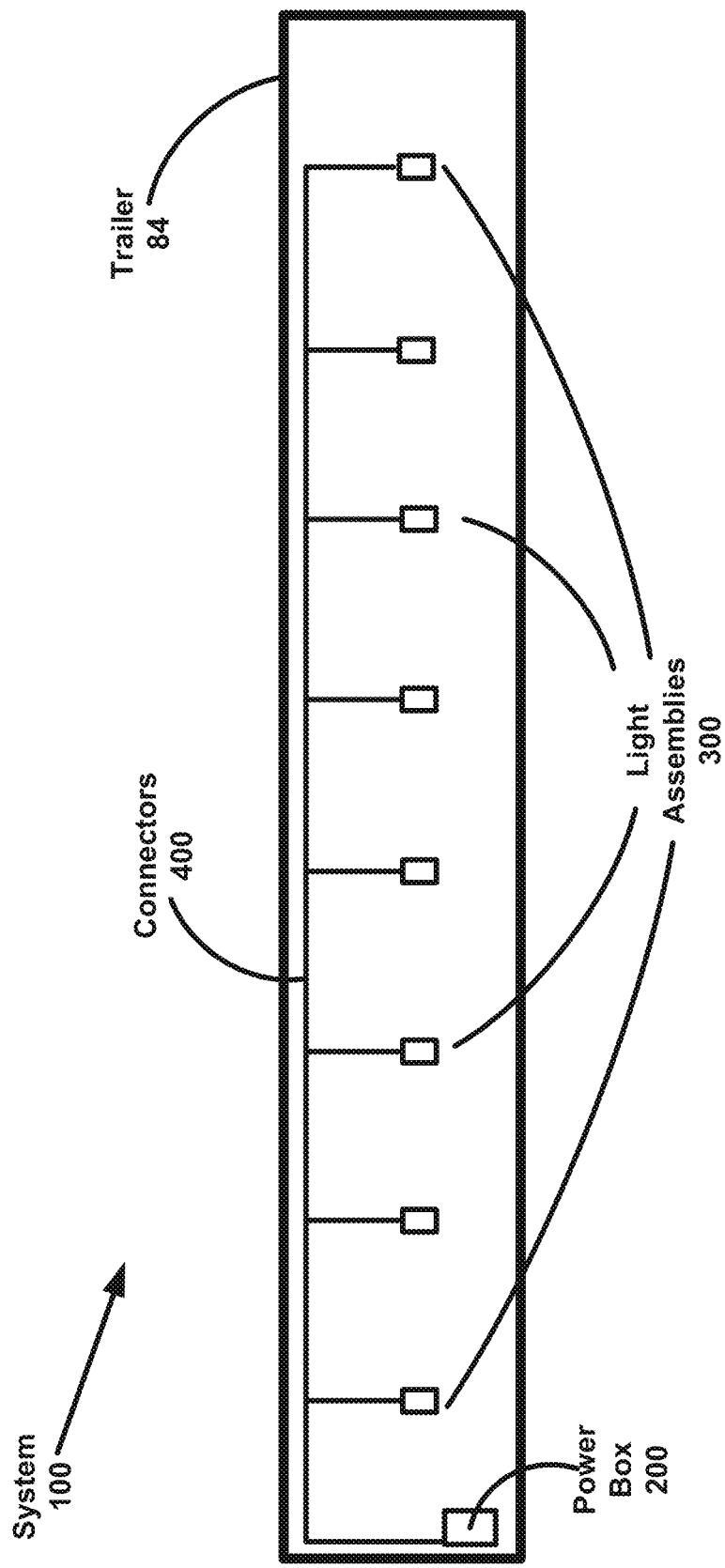
FIG. 2C is a top-view block diagram illustrating an example of the system that includes 1 power box and 8 LED assemblies, with the connectors, power box, and light assemblies being positioned in the overhead space.
Figure 2D:
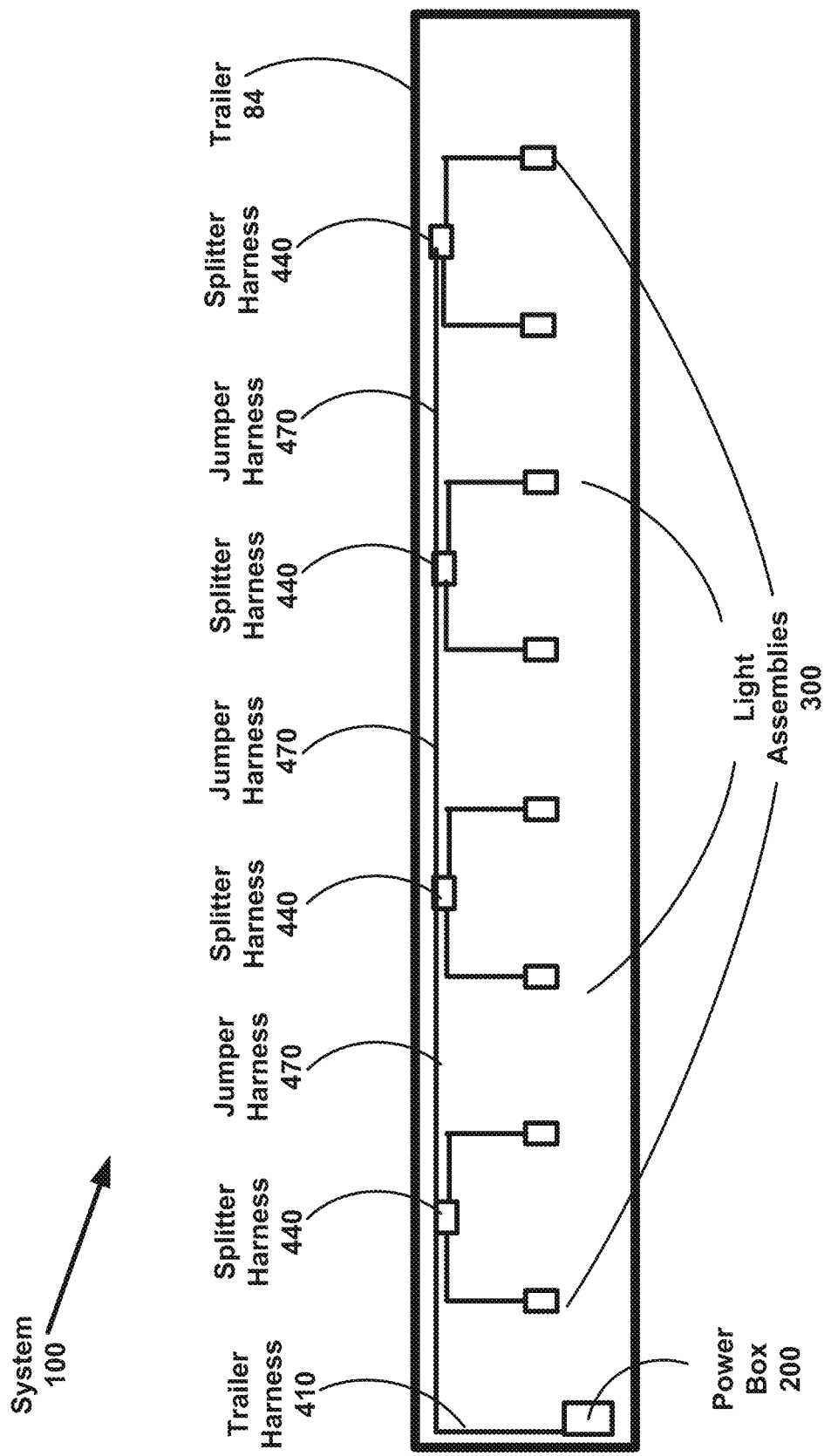
FIG. 2D is a top-view block diagram illustrating an example of the system that includes 1 power box, 8 LED assemblies, 1 trailer harness 410, 4 splitter harnesses, and 3 jumper harnesses.
Figure 3A:
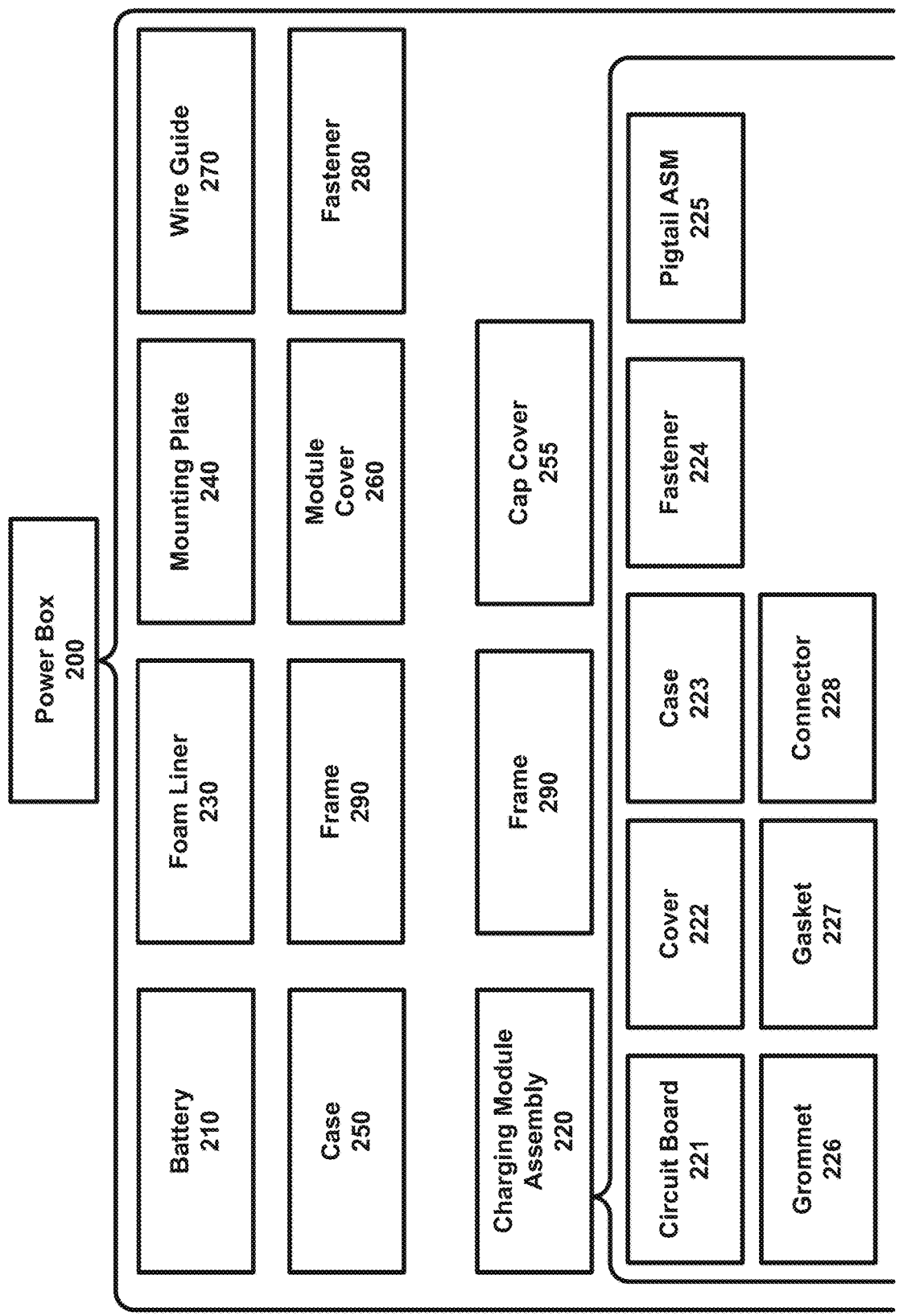
FIG. 3A is a block diagram illustrating examples of the different components that can included in the power box.
Figure 3B:
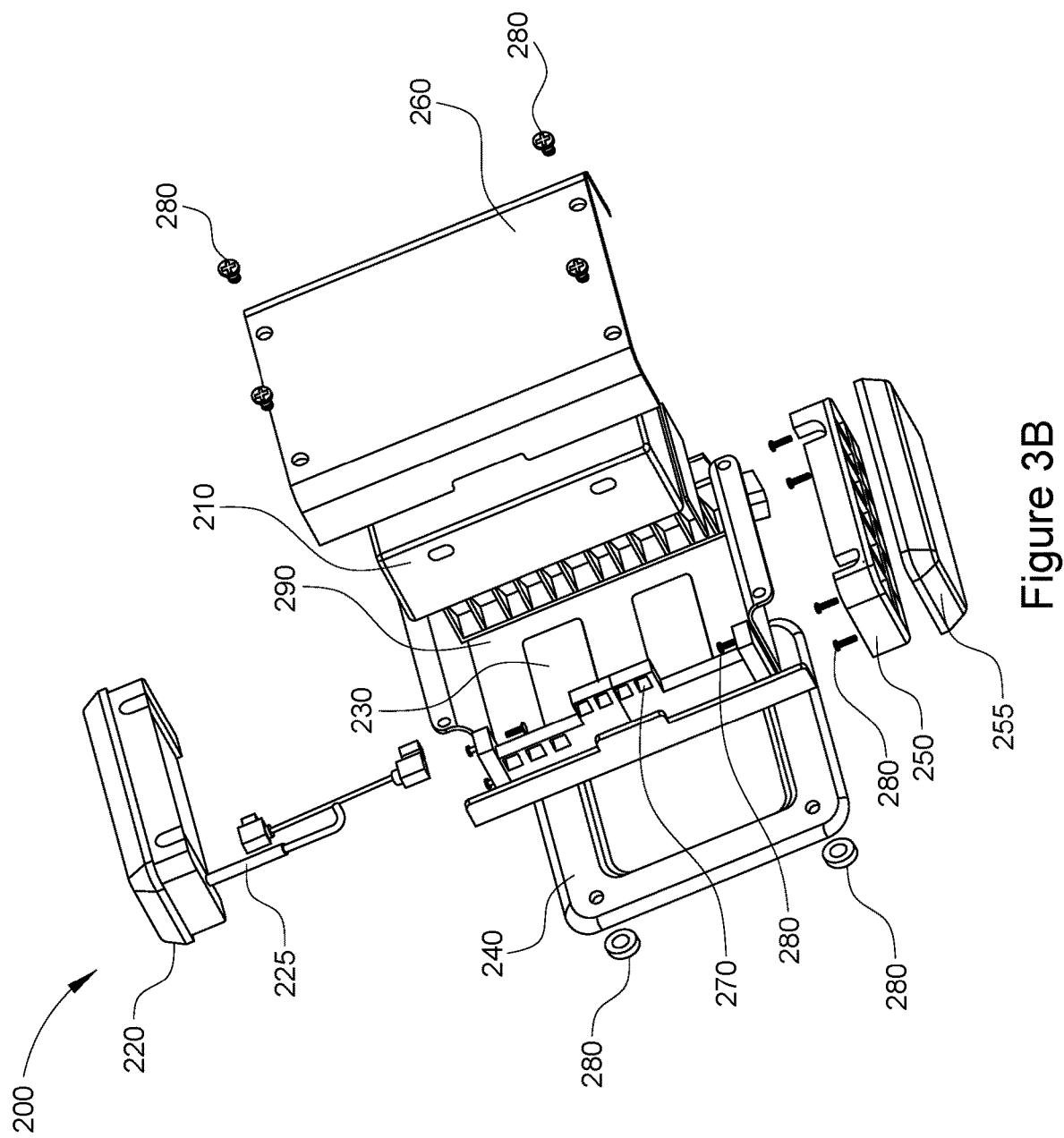
FIG. 3B is an exploded view diagram illustrating an example of a power box.
Figure 3C:
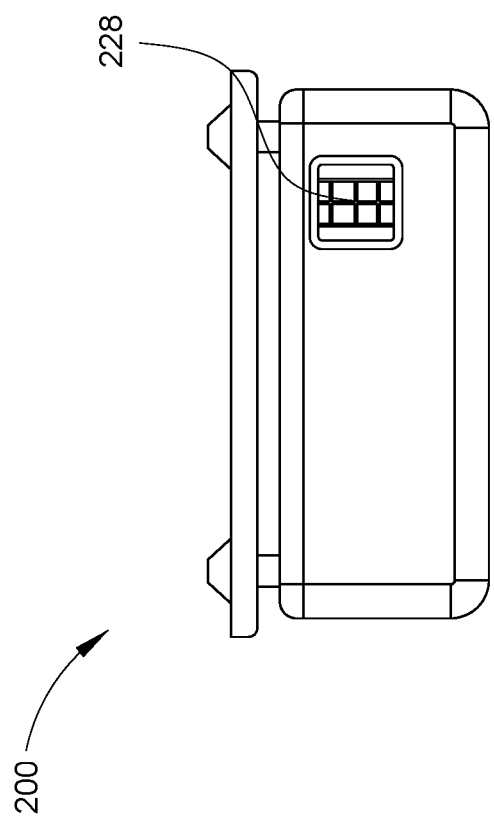
FIG. 3C is a vertical view diagram illustrating an example of the power box.
Figure 3F:
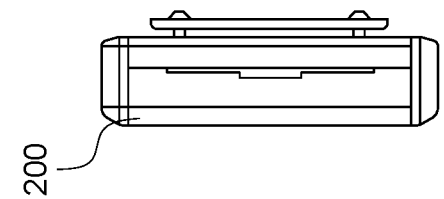
FIG. 3F is a side view diagram illustrating an example of the power box.
Figure 3E:
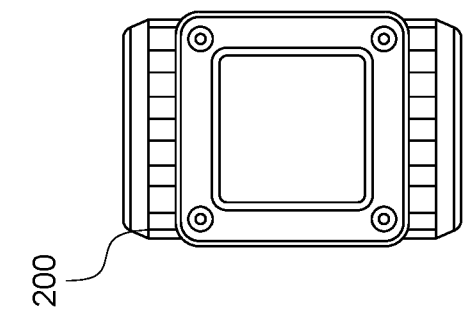
FIG. 3E is a rear-view diagram illustrating an example of the power box.
Figure 3D:
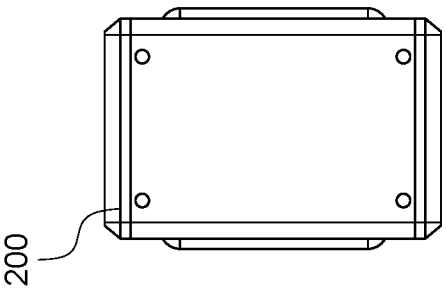
FIG. 3D is a front view diagram illustrating an example of the power box
Figure 3G:
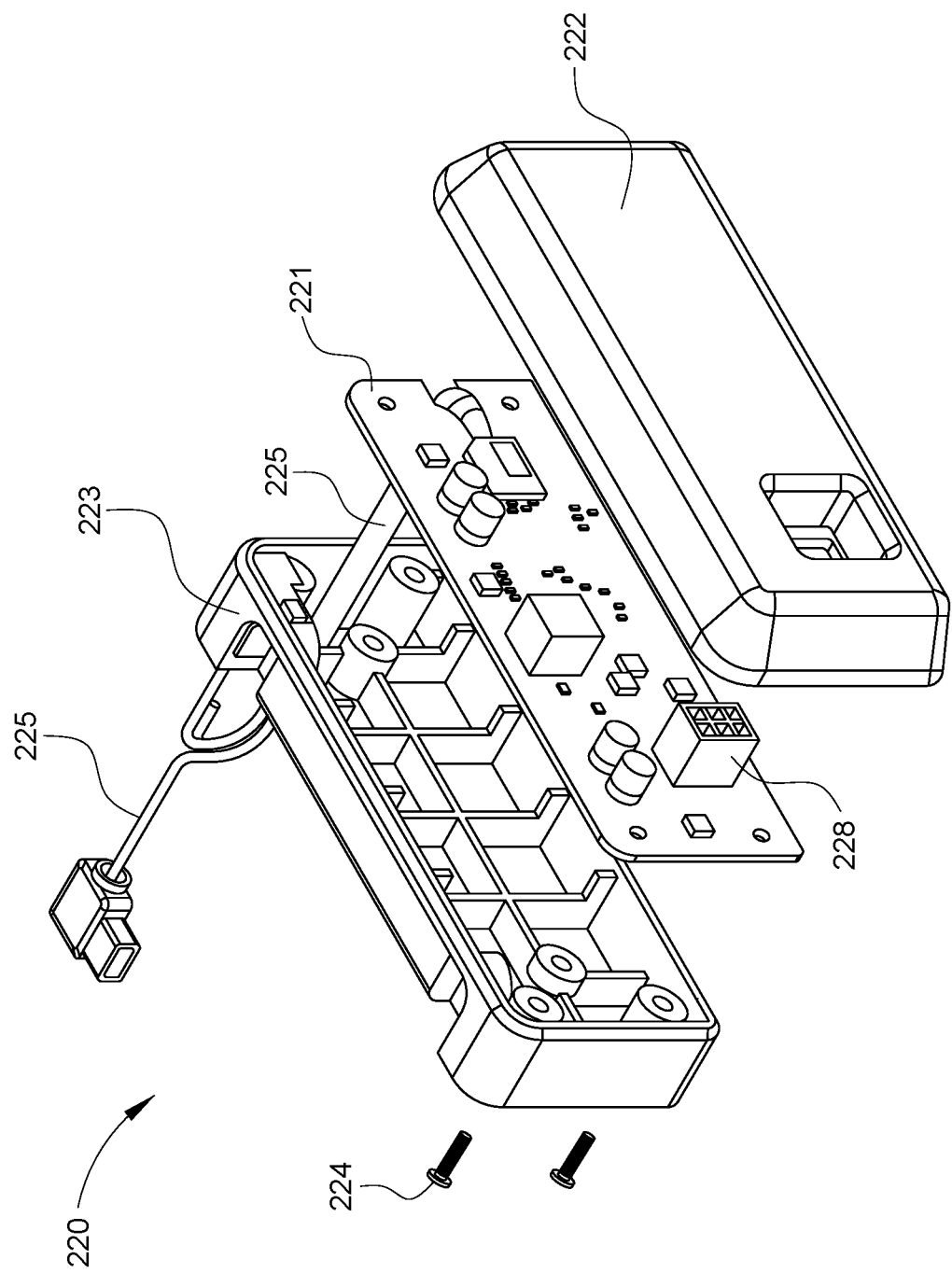
FIG. 3G is an exploded view diagram illustrating an example of the charging module assembly.
Figure 3H:
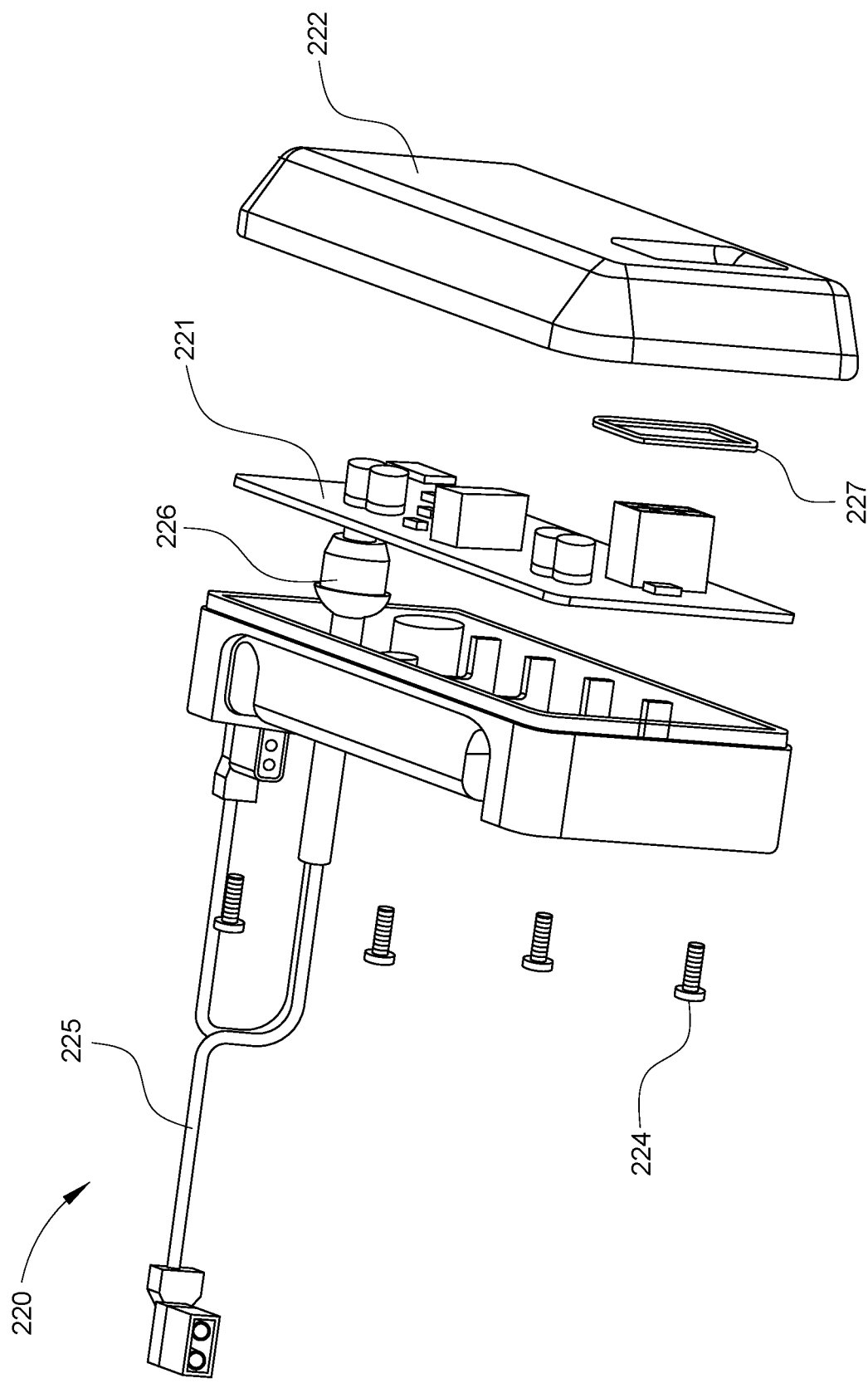
FIG. 3H is an exploded view diagram illustrating an example of the charging module assembly that includes a gasket and a grommet.
Figure 4A:
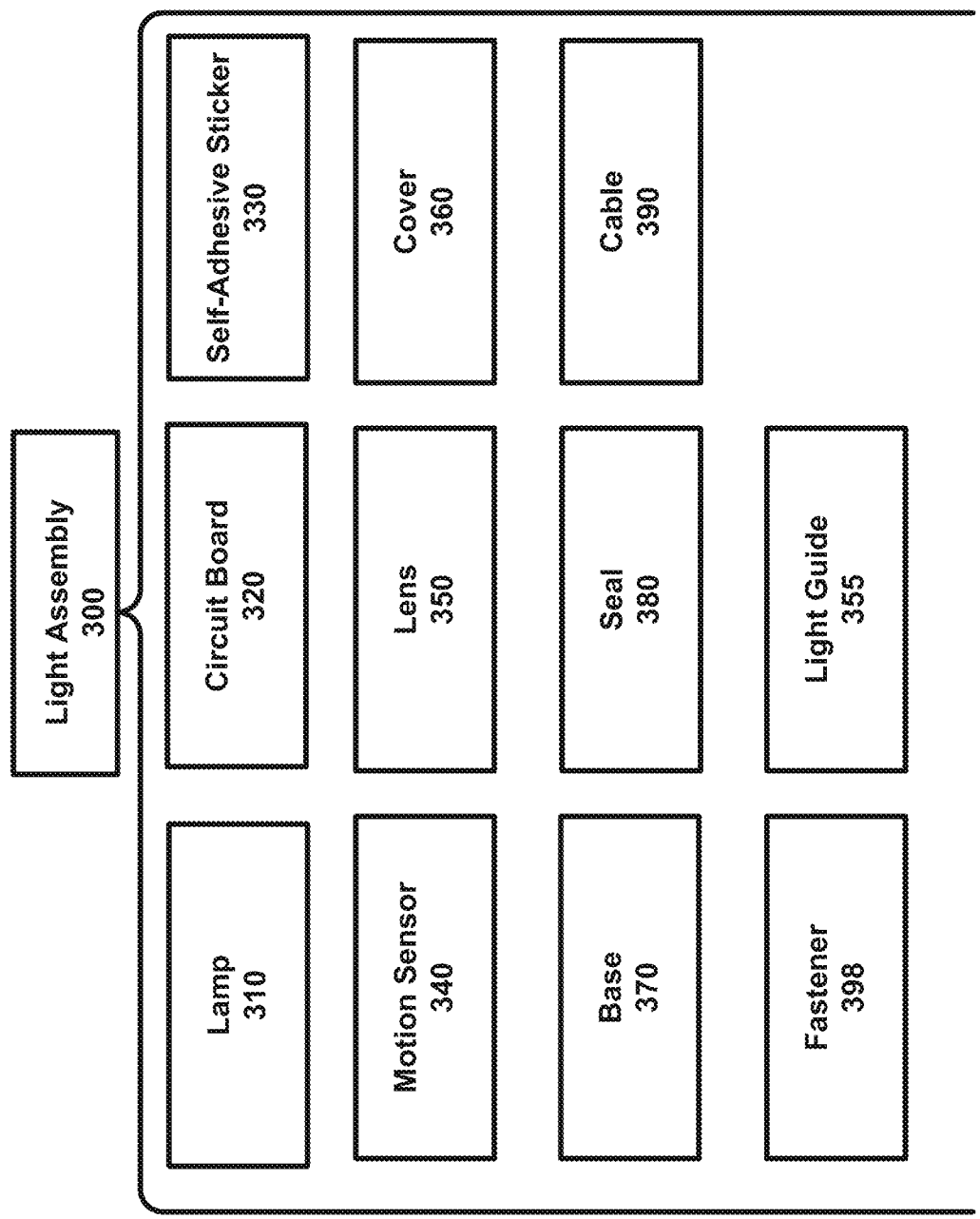
FIG. 4A is a block diagram illustrating an example of the different components that can be included in the light assembly.
Figure 4C:
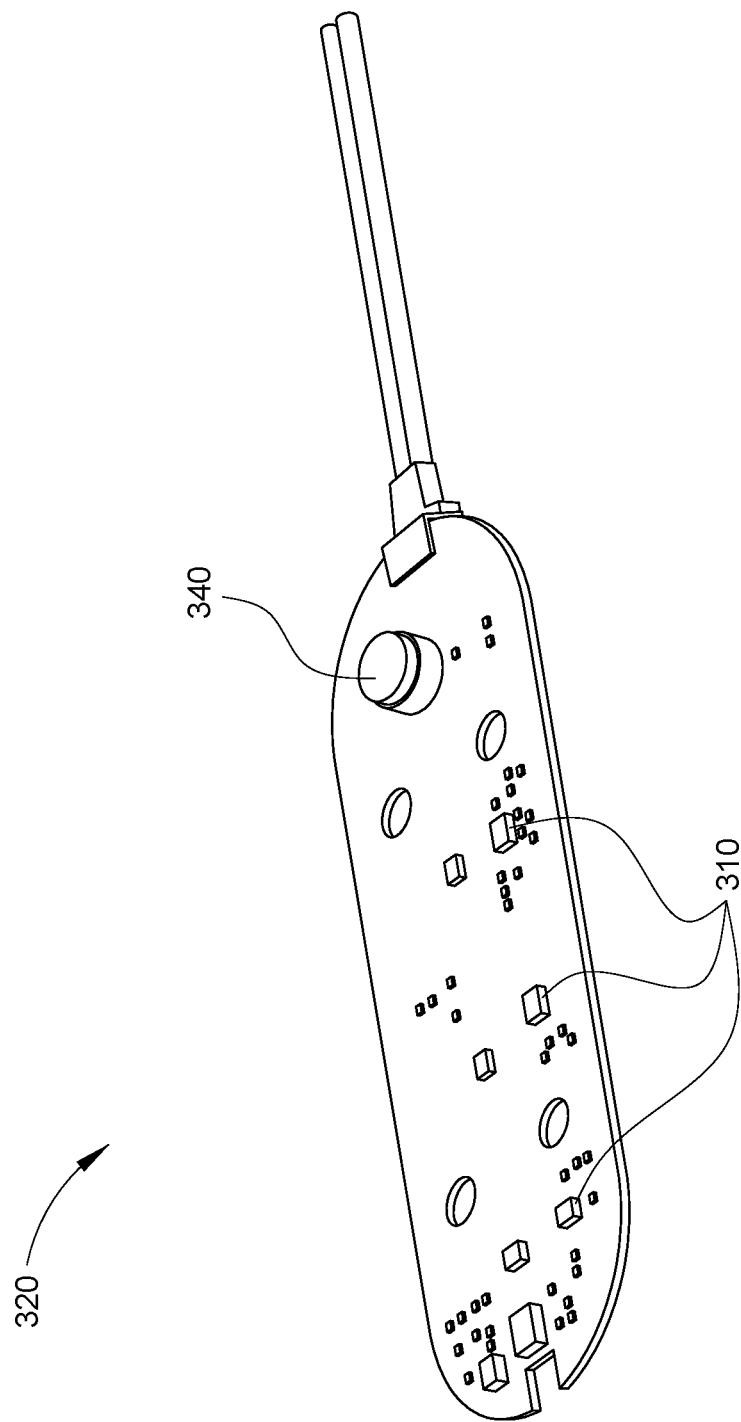
FIG. 4C is a perspective view of the circuit board that can be used in the light assembly.
Figure 4G:
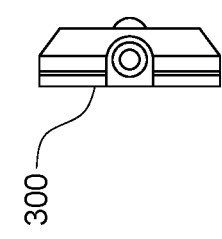
FIG. 4G is a front view diagram illustrating an example of the of the light assembly.
Figure 4H:
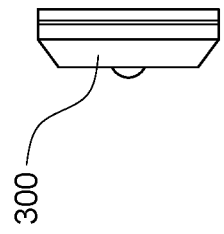
FIG. 4H is a front view diagram illustrating an example of the of the light assembly.
Figure 4D:
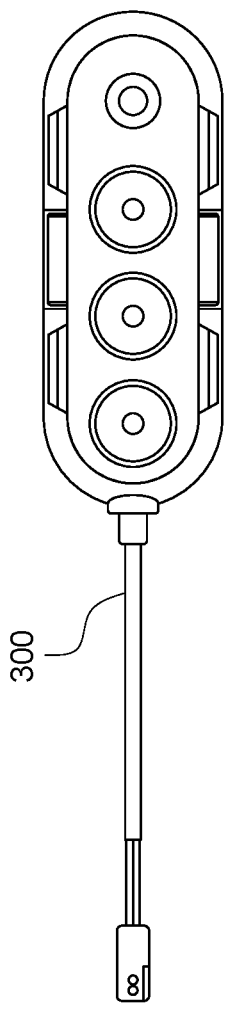
FIG. 4D is a top view of the light assembly, the side that faces into the interior when mounted in the interior.
Figure 4E:
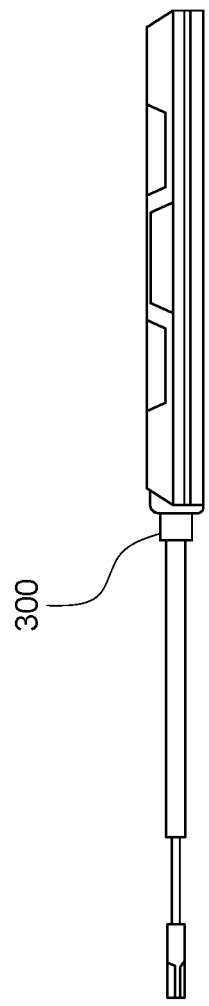
FIG. 4E is a side view diagram illustrating an example of the light assembly.
Figure 4F:
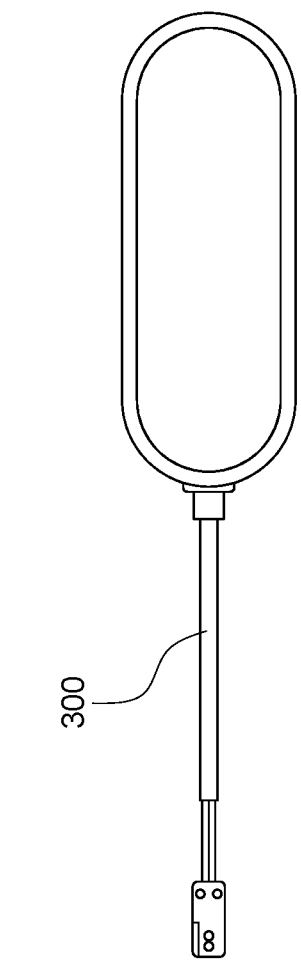
FIG. 4F is a bottom view diagram illustrating an example of the of the light assembly.
Figure 4I:
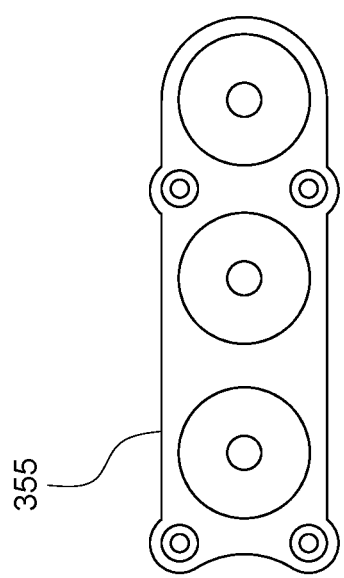
FIG. 4I is a top view diagram illustrating an example of a light guide.
Figure 4J:
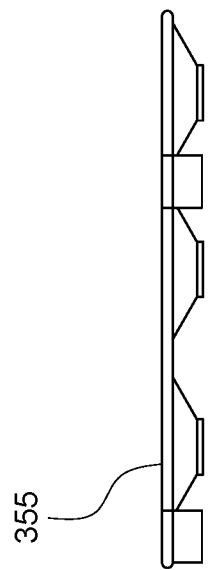
FIG. 4J is a side view diagram illustrating an example of a light guide.

FIG. 2C is a block diagram illustrating an example of the system that includes 1 power box and 8 LED assemblies. This represents a desirable configuration for many semi-trailers 84. FIG. 2C represents a similar configuration, using the preferred connectors of a trailer harness 410, 4 splitter harnesses, and 3 jumper harnesses. The power box 200 and the various connectors 400 can be position in the overhead space 94, where they are unlikely to be damaged in the process of loading and unloading cargo. The only component of the system 100 that must be positioned in the cargo area 96 are the recessed lights of the light assembly 300, which can benefit from being positioned by a rib 92.

FIG. 2E is an example of a view of the ceiling from within the interior space in which the system has been installed.

The system 100 has many advantages. The configuration displayed in FIG. 2C would be the only untethered lighting kit on the market. It can provide 5-8 hours of light between charges. It can be installed easily and is highly configurable. Each light assembly 300 can include its own motion detector 340, so lights are only used as needed—there is no need to light up the entire interior 90 each time. Such as system 100 has components that can are less likely to be damaged, but if they are damaged, they can be easily replaced.

VII. Power Box

FIGS. 3A through 3H illustrate different components of the power box 200. In a preferred embodiment, a 12 Vdc AGM batter is used. The power box can perform the functions of an integrated battery manager using the circuit board 320 to implement a various process to prevent overcharging of the battery, damage from low-voltage, reverse battery protection, and provide a basis to jump start the truck 80. The power box 200 can provide a fast on batter connection. The power box 200 can also provide integrated resettable fuse protection.

The processing logic or "brains" of the power box is provided through the charging module 220 and its circuit board 221 which includes a processor.

The 6-way trailer harness 410 and the smart processor on the circuit board 221 of the charging assembly transforms the power box 200 into a manager of the electrical needs of the trailer 84. The trailer harness 410 can access trailer power, ground, inputs for the light assemblies, output for the light assemblies, as well as inputs and outputs for other sources of electricity such as a solar power assembly 500, an exterior electrical outlet, or the battery in the tractor.

The mounting plate 240 of the power box 200 allows the power box 200 to be secured in a variety of desirable and out of the way locations within the interior 80. Impact resistant polycarbonate end caps and anodized aluminum to protect the mounting from moisture and other potential environmental challenges. The batter 210 with in the power box 200 is highly modular and can be replaced without replacing the other components of the power box 200. The charging module 220 is self-contained even within the otherwise contained power box 200. The space for holding the battery 210 provides for error proof battery orientation. Power can ground terminals can be concealed within the battery body to prevent accidental electrical shorts.

The collective impact of a configuration that includes a frame, a foam liner, a self-contained charging module, a top cover and lower cap cover serve to avoid the keep the power box sealed tight from the outside world while also compartmentalizing any interior damage.

VIII. Lamp Assembly

FIGS. 4A-4J illustrated different components, views, and configurations of the light assemblies 300. The granular functionality of having local processors on the circuit boards 320 with their own lights 310 and their motion detectors 340 to control the lights 310 on that bored. The lens 350 and light guide 355 make the illumination more user friendly. The light guide 355 is cone shaped and made of reflective material in a preferred embodiment of the system 100.

The ability to add, remove, or reposition the lamp assemblies 300 (which can also be referred to as light assemblies 300) provides truck operators which an ongoing and highly flexible illumination infrastructure within the trailers of their trucks.

Each light assembly 300 can include its own circuit board and processor used to monitor, manage, and control a motion sensor and the LED lights affixed to that particular light assembly 300. Thus, the light assemblies 300 function independently of each other even if the electrical power is driven in series through the chain of connectors 400.

The circuit boards 320 and processors of the lamp assemblies 300 can perform onboard voltage compensation to provide uniform light output. The light assemblies 300 can provide "on time".

In certain contexts, an adhesive may not be the most desirable way to mount the light assemblies 300, in which case cap mounts and fasteners can be used.

VIII. Connectors

FIGS. 5A-5F illustrate different example of connectors 400 and different configurations of connectors 400.

The trailer harness 410 can provide a 6-way connector that integrates the power box into the different components in the trailer 84.

Figure 5A:
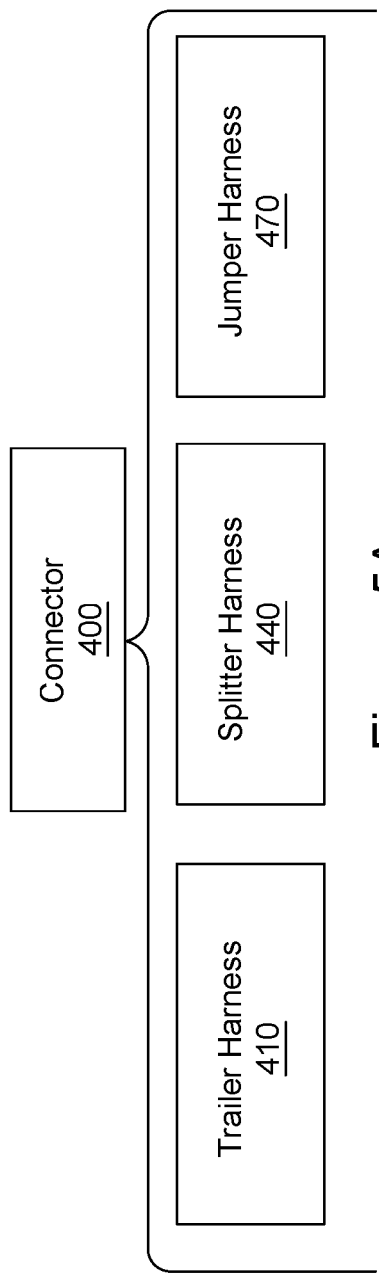
FIG. 5A is a block diagram illustrating an example of connectors that can be used to form electrical circuits with the power box and light assemblies.
Figure 5B:
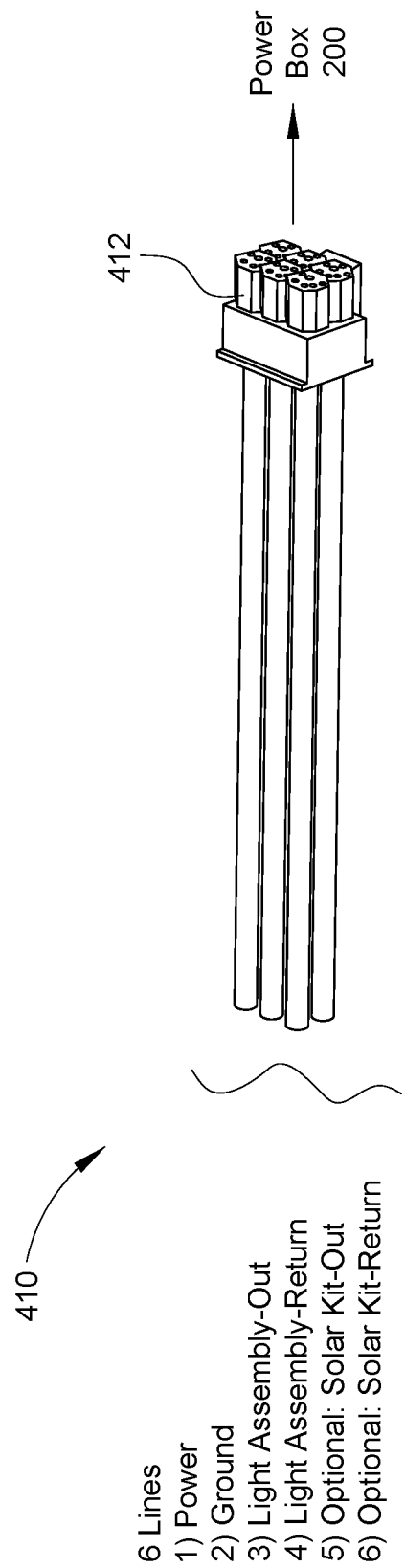
FIG. 5B is a perspective view diagram illustrating an example of a trailer harness.
Figure 5C:
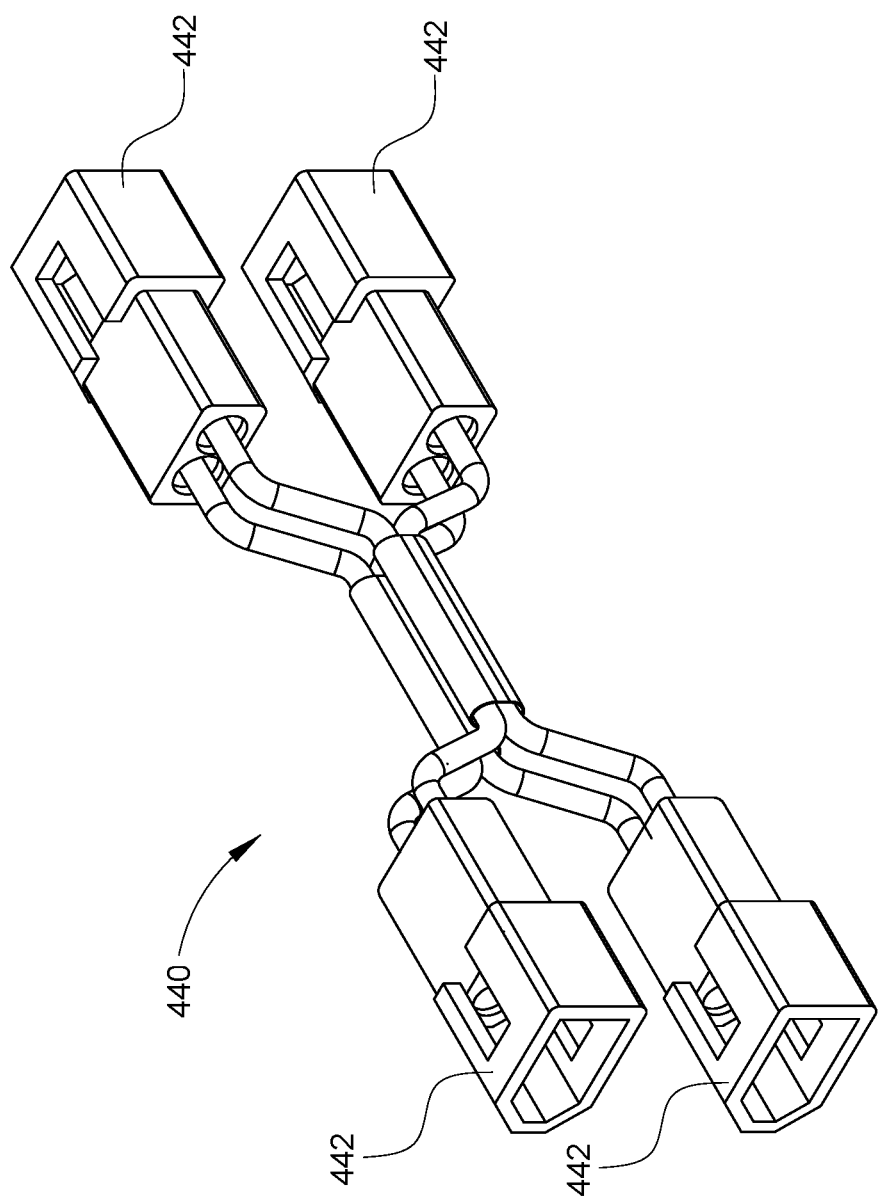
FIG. 5C is a perspective view diagram illustrating an example of a splitter harness.
Figure 5D:
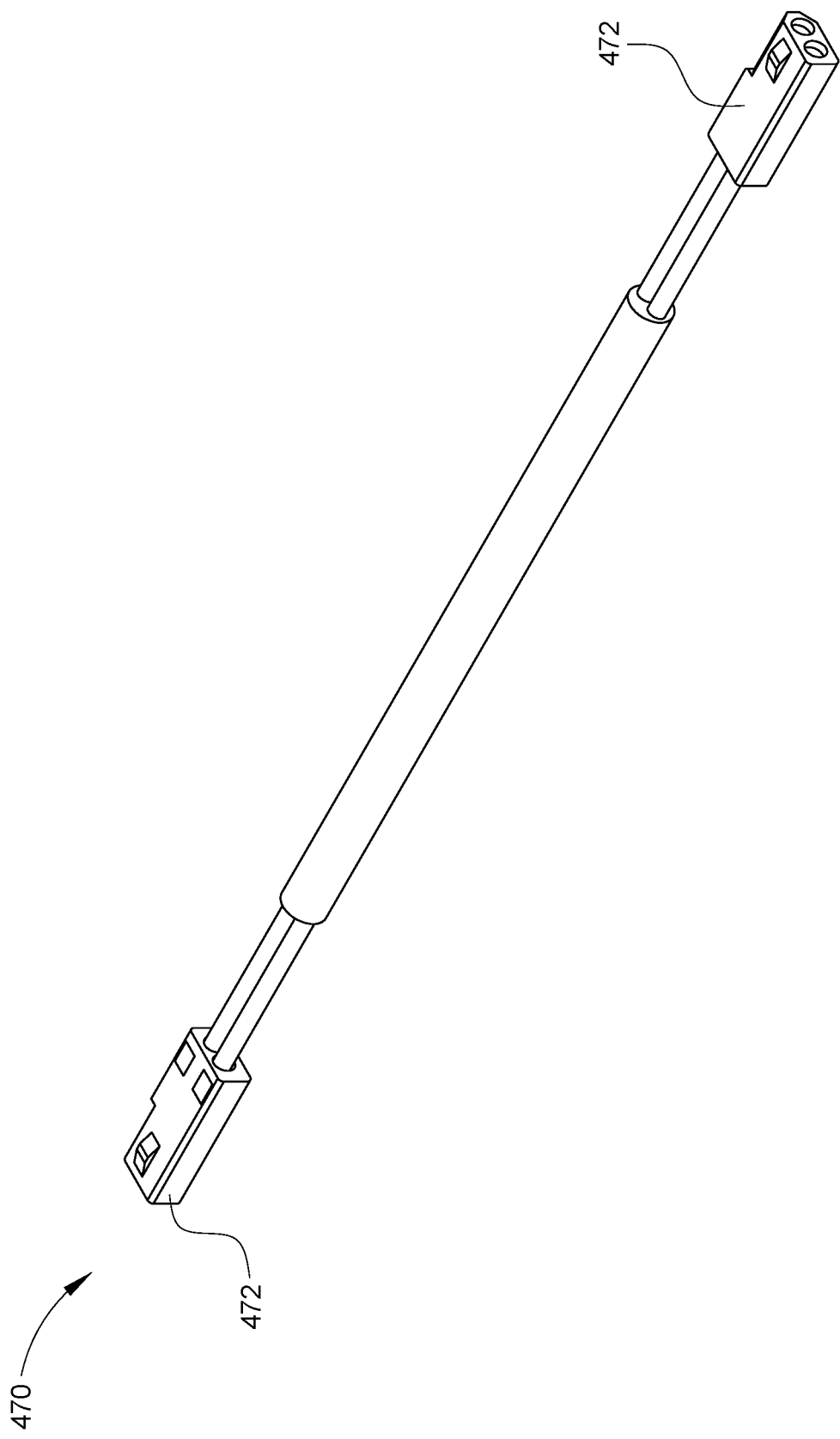
FIG. 5D is a perspective view diagram illustrating an example of a jumper harness.
Figure 5E:
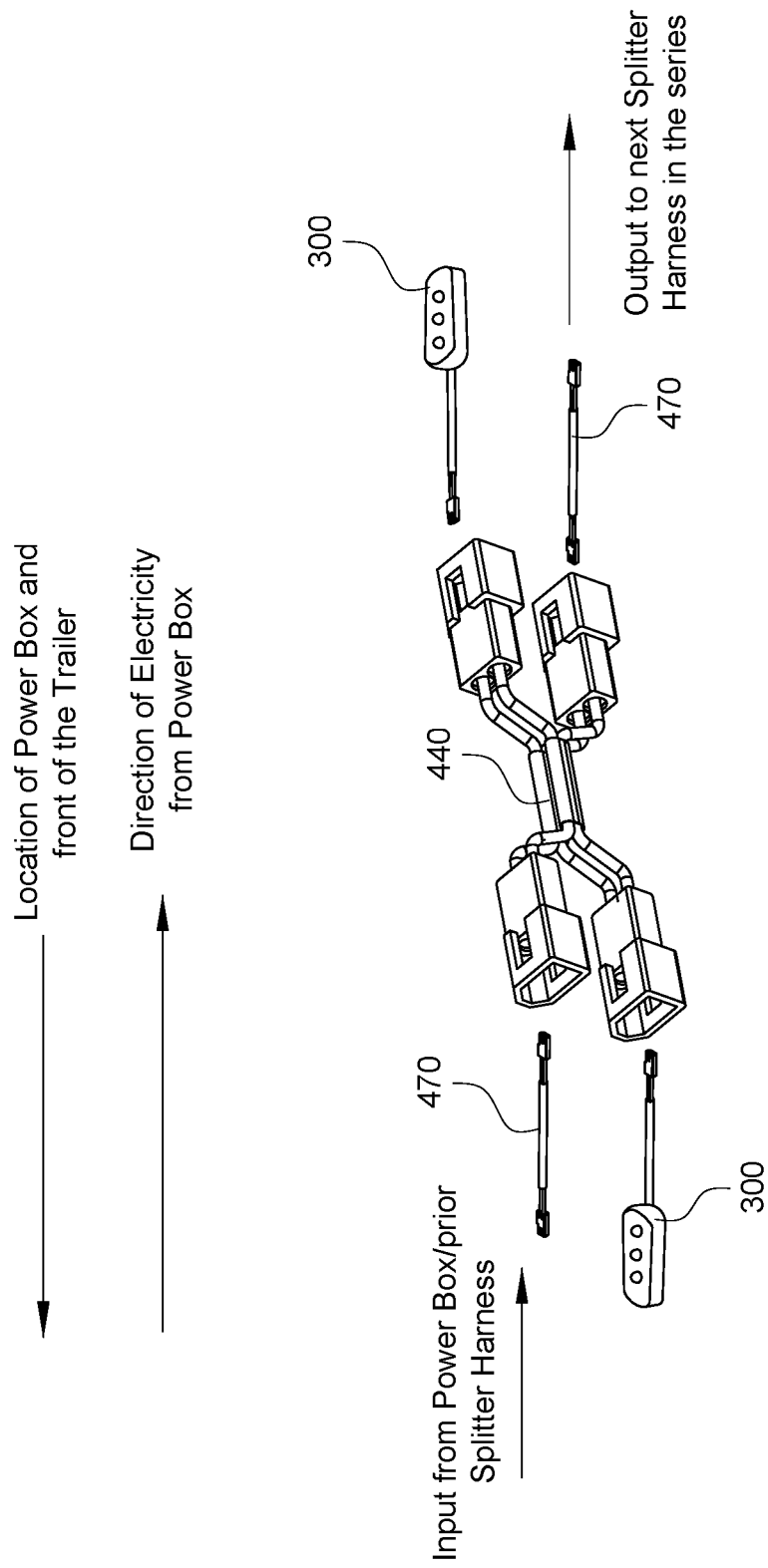
FIG. 5E is a block diagram illustrating an example of the different connections between the components of the system.
Figure 5F:
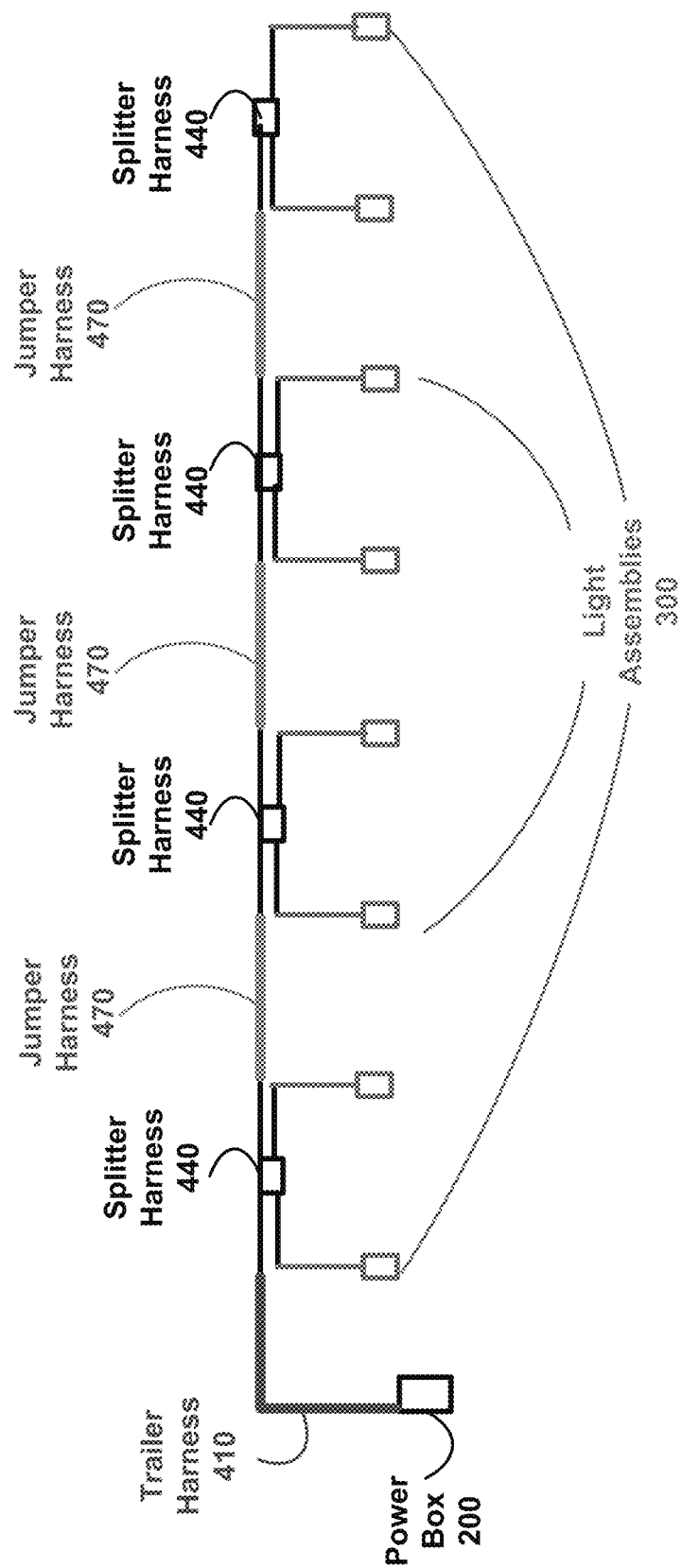
FIG. 5F is a block diagram illustrating an example of a configuration of connectors.

The splitter harness 440 in alternative sequence with the jumper harness 470 provide the ability to add lighting assemblies 300 as desired, or to remove them as desired. FIGS. 5E and 5F illustrated a configuration of connectors 400 that can be used in a preferred embodiment of the system 100.

IX. Methods

A. Method of Installing

As illustrated in FIG. 6A, the system 100 can be installed using an installation method 910 comprising.

Assessing the needs of the space occurs at 912.

Positioning the power box 200 and light assemblies 300 occurs at 920.

Connecting the power box 200 and light assemblies 300 occurs at 930. This is done with the applicable connectors 400.

B. Method of Using

FIG. 6B illustrates an example of a method of using the installed system 100.

At 960, one or more lamp assemblies 300 are activated by the detection of motion by the application motion detector 340.

At 970, when motion is no longer detected for a predefined period of time, the lights are turned off by the circuit board 320 in control of that specific motion sensor 340 and those specific lights 310.

The invention claimed is:

1. A system (100) that is adapted for use in the selective illumination of the interior (90) of a trailer (84) of a tractor (82), said system (100) comprising:
   a power box (200) positioned in the interior (90) of the trailer (84), said power box (200) including
      a battery (210) for storing electricity; and
      a charging assembly (220) for charging said battery (210);
   a light assembly (300) positioned in the interior (90) of the trailer (84), said light assembly (300) including:
      a light (310) that receives power from said battery (210); and
      a motion sensor (340) for triggering the activation of said light (310) using electricity from said power box (200); and
   a plurality of connectors (400), said plurality of connectors (400) including a first connector (400) adapted to draw power from the tractor (82) to said power box (200) and a second connector (400) adapted to deliver power from said power box (200) to said light assembly (300).

2. The system (100) of claim 1, wherein said power box (200) is adapted to deliver electricity to said light assembly (300) when the trailer (84) is not tethered to said tractor (82), and wherein said power box (200) is adapted to draw electricity from the tractor (82) when the tractor (82) is tethered to said trailer (84).

3. The system (100) of claim 1, wherein said light assembly (300) further includes a light guide (355), wherein said light guide (355) includes a conical shape, wherein said power box (200) is positioned above a plurality of ribs (92) that separate an overhead space (94) from the cargo space (96).

4. The system (100) of claim 1, wherein said light assembly (300) further includes a circuit board (320), wherein said circuit board (320) comprises a plurality of said lights (310) and said motion sensor (340), wherein said plurality of lights (310) are LED lights, wherein said motion sensor (340) is an ultraviolet motion sensor, wherein said plurality of lights (310) on said circuit board (320) cannot be activated by any other component than the motion sensor (340) on said same circuit board (320), and wherein said power box (200) is positioned within said overhead space (94) above said plurality of ribs (92).

5. The system (100) of claim 4, wherein said circuit board (320) is prewired to a cable (390) that is adapted to mate with one of said connectors (400), wherein said circuit board (320) is adapted for voltage regulation, wherein said plurality of light assemblies (300) are positioned in said cargo space (94) below said plurality of ribs (92).

6. The system (100) of claim 4, said light assembly (300) further including a base (370) comprised of a heat insulating material, and wherein said base (370) is secured on a panel (98) positioned in a gap (97) between two ribs (92) is said plurality of ribs (92).

7. The system (100) of claim 6, wherein said light assembly (300) further includes an adhesive (330) attached to said base (370) that is adapted to secure said base (370) to a ceiling in the cargo space (96) of the trailer (84), and wherein said light assembly (300) is adapted to be removably attached to ceiling in the cargo space (96).

8. The system (100) of claim 1, wherein all of said connectors (400) include an error-proof Molex connector (442).

9. The system (100) of claim 1, wherein said plurality of connectors (400) includes a trailer harness (410) with a 6-way connector (412) adapted to mate with a mating plug (288) on a circuit board (221) within said power box (200), wherein said trailer harness (410) is adapted to draw power from the trailer (82) and deliver power to a plurality of light assemblies (300) through a plurality of splitter harnesses (440) and a plurality of jumper harnesses (470), wherein no said splitter harness (440) directly mates with another any other said splitter harness (440) and wherein no said jumper harness (470) directly mates with any other said jumper harness (470).

10. The system (100) of claim 1, said system (100) comprising a plurality of light assemblies (300), said plurality of light assemblies (300) including first light assembly (300) and second light assembly (300), wherein said first light assembly (300) includes a first motion sensor (340) and a first plurality of lights (310), wherein said second light assembly (300) includes a second motion sensor (340) and said second plurality of lights (310).

11. The system (100) of claim 10, wherein said first plurality of lights (310) are adapted to be exclusively activated by said first motion sensor (340) and wherein said second plurality of lights (310) are adapted to be exclusively activated by said second motion sensor (340).

12. The system (100) of claim 1, wherein said system (100) is adapted to be removably installed in said trailer (84).

13. The system (100) of claim 1, said charging module assembly (220) comprising a circuit board (221), wherein said circuit board (221) implements a charging algorithm to enhance the longevity of the battery (210), wherein said charging module assembly (220) is positioned above a plurality of ribs (92) within an overhead space (94).

14. The system (100) of claim 13, wherein said circuit board (221) is adapted to implement an overcharge protection, a low-voltage cut-out function, a reverse battery protection, and a jump start protection, and wherein said charging module (220) includes a mounting plate (240) and a mating plug (228).

15. The system (100) of claim 13, wherein said circuit board (221) is adapted to provide an integrated resettable fuse protection.

16. The system (100) of claim 1, wherein said charging assembly (220) includes a circuit board (221) adapted to implement a charge algorithm to preserve battery life, overcharge protection, a low-voltage cut-out function, a reverse battery function, and a jump start protection.

17. The system (100) of claim 1, wherein said battery (210) is adapted to power said light assembly (300) for up to about 8 hours without said powerbox (200) drawing electricity from said tractor (82).

18. The system (100) of claim 1, wherein only said first connector (400) draws power from the tractor (82) to said power box (200) and wherein only said second connector (400) delivers power from said power box (200) to said light assembly (300).

19. A system (100) that is adapted for use in the selective illumination of the interior (90) of a trailer (84) of a tractor (82), said system (100) comprising:
a power box (200), said power box (200) including:
a battery (210) for storing electricity originating from the tractor (82);
a mounting plate (240) for securing said power box (210) to a surface in an overhead space (94) within the interior (90) of the trailer (84); and
a charging assembly (220) for charging said battery (210), said charging assembly (220) comprising:
a circuit board (221) adapted to implement a charge algorithm to preserve battery life, overcharge protection, a low-voltage cut-out function, a reverse battery function, and a jump start protection; and
a case (223) and cover (222) to independently secure and seal said circuit board (221) within said charging assembly (220);
wherein said circuit board (221) includes a mating plug (220) which is the only plug on said power box (200) that is accessible from outside said power box (200); and
a plurality of light assemblies (300), wherein said plurality of light assemblies (300) include a circuit board (320) receiving power exclusively through said power box (200), wherein each said circuit board (320) comprises:
a plurality of LED lights (310) that receives power from said battery (210); and
a motion sensor (340) for triggering the activation of said LED lights (310) that share the same circuit board (320);
a plurality of connectors (400) adapted to direct electricity to said plurality of light assemblies (300), said plurality of connectors (400) including a trailer harness (410), a plurality of splitter harnesses (440), and a plurality of jumper harnesses (470), wherein no said splitter harness (440) mates with any other said splitter harness (440), and wherein no said jumper harness (470) mates with any other said jumper harness (470), first connector (400) adapted to draw power from the tractor (82) to said power box (200) and a second connector (400) deliver power from said power box (200) to said light assembly (300).

20. A method (900) for installing a configurable illumination system (100) in a trailer (84) that is adapted to be tethered and pulled by a tractor (82), wherein the trailer (84) includes an interior (90) that includes a cargo space (96) below an overhead space (94) that is separated by a plurality of ribs (92), said method (900) comprising:

assessing at (512) the lighting needs of the interior (90);

positioning at (520) a power box (200) and a plurality of light assemblies (300);

said power box (200) including a battery (210) for storing electricity originating from the tractor (82) and delivering electricity to said plurality of light assemblies (300);

said plurality of light assemblies (300) including a plurality of motion sensors (340) and the plurality of lights (310);

wherein said power box (200) is removably attached within the overhead space (94); and wherein said plurality of light assemblies (300) are removably attached at the top of the cargo space (96); and securing at (530) a plurality of connectors (400) to said power box (200) and said plurality of light assemblies (300).

\* \* \* \* \*